United States Patent
Sakagawa et al.

(10) Patent No.: US 12,103,624 B2
(45) Date of Patent: Oct. 1, 2024

(54) RIDER-POSTURE CHANGING DEVICE AND CONTROL SYSTEM OF HUMAN-POWERED VEHICLE

(71) Applicant: SHIMANO INC., Sakai (JP)

(72) Inventors: Yuki Sakagawa, Sakai (JP); Toyoto Shirai, Sakai (JP)

(73) Assignee: SHIMANO INC., Sakai (JP)

(*) Notice: Subject to any disclaimer, the term of this patent is extended or adjusted under 35 U.S.C. 154(b) by 950 days.

(21) Appl. No.: 16/985,184

(22) Filed: Aug. 4, 2020

(65) Prior Publication Data
US 2022/0041234 A1 Feb. 10, 2022

(51) Int. Cl.
*B62J 1/08* (2006.01)
*B62J 45/40* (2020.01)
*B62J 45/42* (2020.01)
*G01D 5/14* (2006.01)
*G01D 5/16* (2006.01)
*G01D 5/34* (2006.01)

(52) U.S. Cl.
CPC ............. *B62J 1/08* (2013.01); *B62J 45/40* (2020.02); *B62J 45/42* (2020.02); *G01D 5/142* (2013.01); *G01D 5/16* (2013.01); *G01D 5/34* (2013.01); *B62J 2001/085* (2013.01)

(58) Field of Classification Search
None
See application file for complete search history.

(56) References Cited

U.S. PATENT DOCUMENTS

| | | | |
|---|---|---|---|
| 7,805,268 B2 | 9/2010 | Takamoto | |
| 8,016,349 B2 * | 9/2011 | Mouri | B62K 19/36 297/215.13 |
| 9,511,809 B2 * | 12/2016 | Kodama | B62J 1/08 |
| 2009/0209375 A1 | 8/2009 | Takamoto | |
| 2013/0138302 A1 * | 5/2013 | Hara | B62J 50/22 701/49 |
| 2017/0096185 A1 * | 4/2017 | Hara | B62J 1/08 |
| 2018/0079462 A1 * | 3/2018 | Shirai | B62K 25/08 |
| 2018/0194418 A1 * | 7/2018 | Bowers | B62J 1/08 |
| 2018/0208269 A1 | 7/2018 | Nose et al. | |
| 2019/0061851 A1 * | 2/2019 | Kurokawa | B62J 45/42 |
| 2019/0193800 A1 * | 6/2019 | Hara | B62J 45/41 |
| 2019/0193801 A1 * | 6/2019 | Hara | G08C 17/00 |

FOREIGN PATENT DOCUMENTS

JP 2019-182283 10/2019

* cited by examiner

*Primary Examiner* — Daniel J Wiley
(74) *Attorney, Agent, or Firm* — MORI & WARD, LLP

(57) ABSTRACT

A rider-posture changing device for a human-powered vehicle comprises a first member, a second member, a first detector, a second detector, and a controller. The first member extends in a longitudinal direction. The second member is configured to be movable relative to the first member in the longitudinal direction. The first detector is configured to detect first information indicating whether the second member reaches an absolute position or not. The second detector is configured to detect second information indicating a movement distance of the second member from a reference position in the longitudinal direction. The controller is configured to obtain a current position of the second member relative to the first member based on the second information and the reference position. The controller is configured to store the absolute position as the reference position in accordance with the first information.

24 Claims, 25 Drawing Sheets

RIDER-POSTURE CHANGING DEVICE AND CONTROL SYSTEM OF HUMAN-POWERED VEHICLE

BACKGROUND OF THE INVENTION

Field of the Invention

The present invention relates to a rider-posture changing device and a control system of a human-powered vehicle.

Discussion of the Background

A human-powered vehicle includes a device configured to change a rider's posture.

SUMMARY OF THE INVENTION

In accordance with a first aspect of the present invention, a rider-posture changing device for a human-powered vehicle comprises a first member, a second member, a first detector, a second detector, and a controller. The first member extends in a longitudinal direction. The second member is configured to be movable relative to the first member in the longitudinal direction. The first detector is configured to detect first information indicating whether the second member reaches an absolute position or not. The second detector is configured to detect second information indicating a movement distance of the second member from a reference position in the longitudinal direction. The controller is configured to obtain a current position of the second member relative to the first member based on the second information and the reference position. The controller is configured to store the absolute position as the reference position in accordance with the first information.

With the rider-posture changing device according to the first aspect, it is possible to improve the accuracy of the current position.

In accordance with a second aspect of the present invention, the rider-posture changing device according to the first aspect is configured so that the controller is configured to reset the second information if the first information indicates that the second member is in a position within a predetermined range including the absolute position.

With the rider-posture changing device according to the second aspect, it is possible to reliably improve the accuracy of the current position while allowing a variety of detectors to be used as the first detector.

In accordance with a third aspect of the present invention, the rider-posture changing device according to the first or second aspect further comprises a first additional detector. The first additional detector is configured to detect first additional information indicating whether the second member reaches an additional absolute position or not. The additional absolute position is spaced apart from the absolute position in the longitudinal direction.

With the rider-posture changing device according to the third aspect, it is possible to further improve the accuracy of the current position using the first additional detector.

In accordance with a fourth aspect of the present invention, the rider-posture changing device according to the third aspect is configured so that the controller is configured to store the additional absolute position as the reference position in accordance with the first additional information.

With the rider-posture changing device according to the fourth aspect, it is possible to further improve the accuracy of the current position.

In accordance with a fifth aspect of the present invention, a rider-posture changing device for a human-powered vehicle comprises a first member, a second member, a first detector, a second detector, and a controller. The first member extends in a longitudinal direction. The second member is configured to be movable relative to the first member in the longitudinal direction. The first detector is configured to detect first information indicating whether the second member reaches an absolute position or not. The second detector is configured to detect second information indicating a movement distance of the second member from a reference position in the longitudinal direction. The controller is configured to obtain a current position of the second member relative to the first member based on the second information and the reference position. The controller is configured to reset the second information in accordance with the first information.

With the rider-posture changing device according to the fifth aspect, it is possible to improve the accuracy of the current position.

In accordance with a sixth aspect of the present invention, the rider-posture changing device according to the fifth aspect further comprises a first additional detector. The first additional detector is configured to detect first additional information indicating whether the second member reaches an additional absolute position or not. The additional absolute position is spaced apart from the absolute position in the longitudinal direction.

With the rider-posture changing device according to the sixth aspect, it is possible to further improve the accuracy of the current position using the first additional detector.

In accordance with a seventh aspect of the present invention, the rider-posture changing device according to the sixth aspect is configured so that the controller is configured to reset the second information in accordance with the first additional information.

With the rider-posture changing device according to the seventh aspect, it is possible to further improve the accuracy of the current position.

In accordance with an eighth aspect of the present invention, the rider-posture changing device according to any one of the fifth to seventh aspects is configured so that the controller is configured to reset the second information if the first information indicates that the second member is in a position within a predetermined range including the absolute position.

With the rider-posture changing device according to the eighth aspect, it is possible to reliably improve the accuracy of the current position while allowing a variety of detectors to be used as the first detector.

In accordance with a ninth aspect of the present invention, the rider-posture changing device according to any one of the first to eighth aspects further comprises a first detection. The first detection object is provided to at least one of the first member and the second member. The first detector is configured to detect the first detection object to obtain the first information.

With the rider-posture changing device according to the ninth aspect, it is possible to reliably detect the first information.

In accordance with a tenth aspect of the present invention, the rider-posture changing device according to the ninth aspect is configured so that the first detector includes a non-contact detector configured to detect the first detection object to obtain the first information without contacting the first detection object.

With the rider-posture changing device according to the tenth aspect, it is possible to reduce wear of the first detector and the first detection object.

In accordance with an eleventh aspect of the present invention, the rider-posture changing device according to the ninth aspect is configured so that the first detector includes a contact detector configured to detect the first detection object to obtain the first information by contacting the first detection object.

With the rider-posture changing device according to the eleventh aspect, it is possible to reliably detect the first information using the contact detector.

In accordance with a twelfth aspect of the present invention, the rider-posture changing device according to any one of the first to eleventh aspects further comprises a second detection. The second detection object is provided to at least one of the first member and the second member. The second detector is configured to detect the second detection object to obtain the second information.

With the rider-posture changing device according to the twelfth aspect, it is possible to reliably detect the second information.

In accordance with a thirteenth aspect of the present invention, the rider-posture changing device according to the twelfth aspect is configured so that the second detector includes a non-contact detector configured to detect the second detection object to obtain the second information without contacting the second detection object.

With the rider-posture changing device according to the thirteenth aspect, it is possible to reduce wear of the second detector and the second detection object.

In accordance with a fourteenth aspect of the present invention, the rider-posture changing device according to any one of the first to thirteenth aspects is configured so that the first detector and the second detector are integrally provided with each other as a single unit.

With the rider-posture changing device according to the fourteenth aspect, it is possible to make the first detector and the second detector more compact.

In accordance with a fifteenth aspect of the present invention, the rider-posture changing device according to any one of the first to fourteenth aspects further comprises a wireless communicator. The controller is configured to be connected to the wireless communicator to wirelessly communicate with an additional wireless communicator.

With the rider-posture changing device according to the fifteenth aspect, it is possible to wirelessly transmit and/or receive signals.

In accordance with a sixteenth aspect of the present invention, the rider-posture changing device according to any one of the first to fifteenth aspects further comprises an informing device. The informing device is configured to inform a user of information relating to the rider-posture changing device.

With the rider-posture changing device according to the sixteenth aspect, it is possible to inform a user of the information relating to the rider-posture changing device.

In accordance with a seventeenth aspect of the present invention, the rider-posture changing device according to any one of the first to sixteenth aspects further comprises an electric power source. The electric power source is configured to supply electric power to the rider-posture changing device.

With the rider-posture changing device according to the seventeenth aspect, it is possible to supply electric power to components of the rider-posture changing device.

In accordance with an eighteenth aspect of the present invention, the rider-posture changing device according to any one of the first to seventeenth aspects further comprises an electrical unit mounted to the first member. The electrical unit includes at least one of the first detector, the second detector, the controller, a wireless communicator, and an informing device. The at least one of the first detector, the second detector, the controller, the wireless communicator, and the informing device provides a single unit configured to be detachably attached to the first member as the single unit.

With the rider-posture changing device according to the eighteenth aspect, it is possible to easily assemble and/or maintain the rider-posture changing device using the electric unit.

In accordance with a nineteenth aspect of the present invention, the rider-posture changing device according to the eighteenth aspect is configured so that the electrical unit is mounted to an upper end of the first member.

With the rider-posture changing device according to the nineteenth aspect, it is possible to allow a user to easily access the electric unit.

In accordance with a twentieth aspect of the present invention, the rider-posture changing device according to any one of the first to nineteenth aspects further comprises an actuator. The first member includes a first tube. The second member includes a second tube. The actuator is configured to make one of the first tube and the second tube movable relative to another of the first tube and the second tube.

With the rider-posture changing device according to the twentieth aspect, it is possible to apply the structure of the rider-posture changing device to a telescopic device.

In accordance with a twenty-first aspect of the present invention, a control system for a human-powered vehicle comprises the rider-posture changing device according to any one of the first to thirtieth aspects and an operating device configured to operate the rider-posture changing device.

With the rider-posture changing device according to the twenty-first aspect, it is possible to operate the rider-posture changing device through the operating device.

In accordance with a twenty-second aspect of the present invention, the rider-posture changing device according to the twenty-first aspect is configured so that the rider-posture changing device includes a height adjustable seatpost assembly.

With the rider-posture changing device according to the twenty-second aspect, it is possible to the structure of the rider-posture changing device to the height adjustable seatpost assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
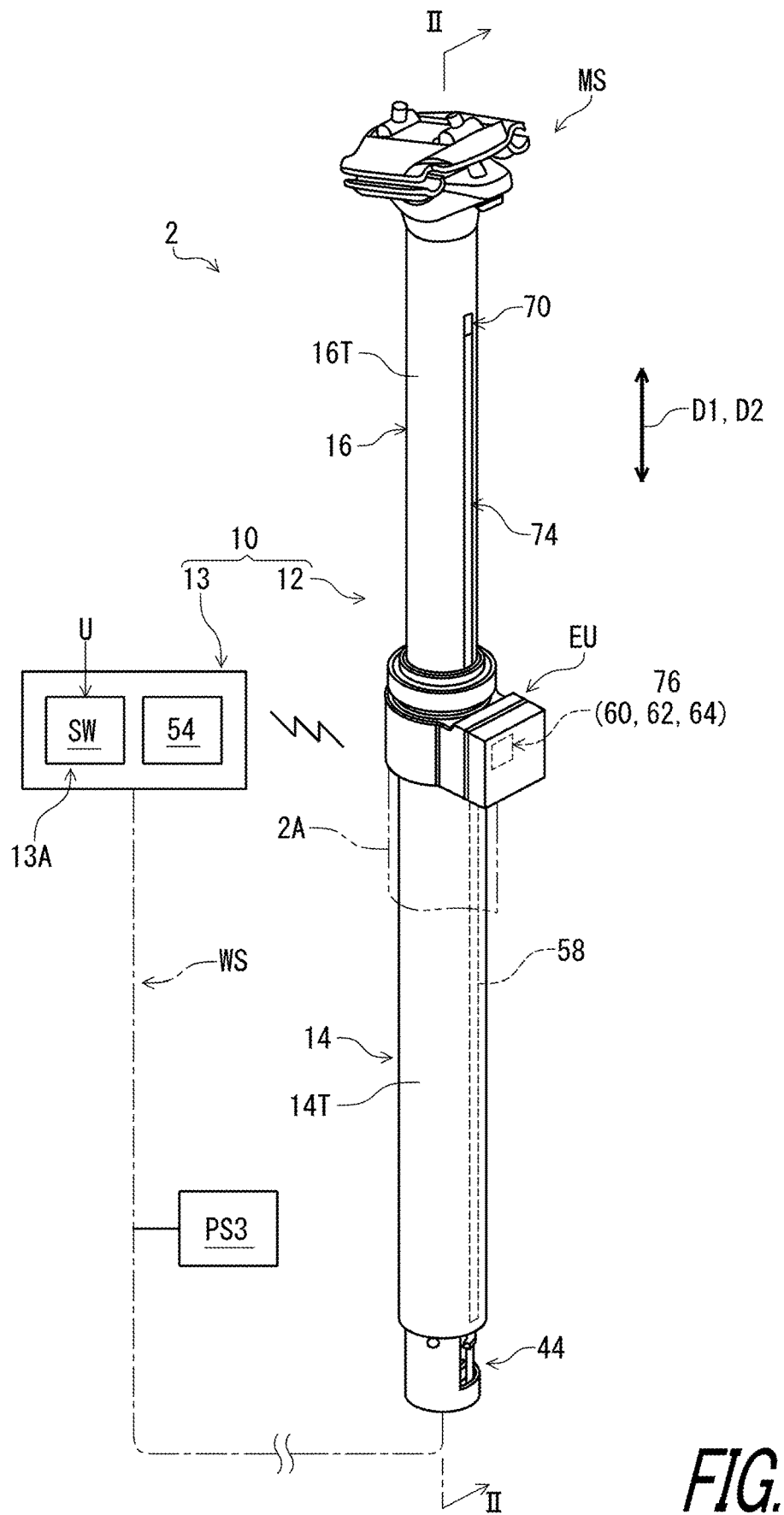
FIG. 1 is a perspective view of a rider-posture changing device of a control system of a human-powered vehicle in accordance with a first embodiment, with a schematic block diagram of an operating device of the control system.

The embodiment(s) will now be described with reference to the accompanying drawings, wherein like reference numerals designate corresponding or identical elements throughout the various drawings.

As seen in FIG. 1, a control system 10 for a human-powered vehicle 2 comprises a rider-posture changing device 12 and an operating device 13. The operating device 13 is configured to operate the rider-posture changing device 12. The operating device 13 is configured to receive a user input U. The rider-posture changing device 12 is configured to move in response to the user input U received by the operating device 13.

The rider-posture changing device 12 for the human-powered vehicle 2 comprises a first member 14 and a second member 16. The first member 14 extends in a longitudinal direction D1. The second member 16 is configured to be movable relative to the first member 14 in the longitudinal direction D1. The first member 14 and the second member 16 are movable relative to each other in the longitudinal direction D1.

The first member 14 includes a first tube 14T. The second member 16 includes a second tube 16T. The second tube 16T is movably coupled to the first tube 14T. The second tube 16T is movably provided in the first tube 14T. However, each of the first member 14 and the second member 16 can have shapes other than a tube.

The rider-posture changing device 12 further comprises a saddle mounting structure MS to fixedly mount a saddle to one of the first member 14 and the second member 16. In the present embodiment, the saddle mounting structure MS is attached to the second member 16 to fixedly mount the saddle to the second member 16. The first member 14 is configured to be mounted to a vehicle body 2A of the human-powered vehicle 2. However, the saddle mounting structure MS can be attached to the first member 14 to fixedly mount the saddle to the first member 14. In such an embodiment, the second member 16 is configured to be mounted to the vehicle body 2A of the human-powered vehicle 2.

Figure 2:
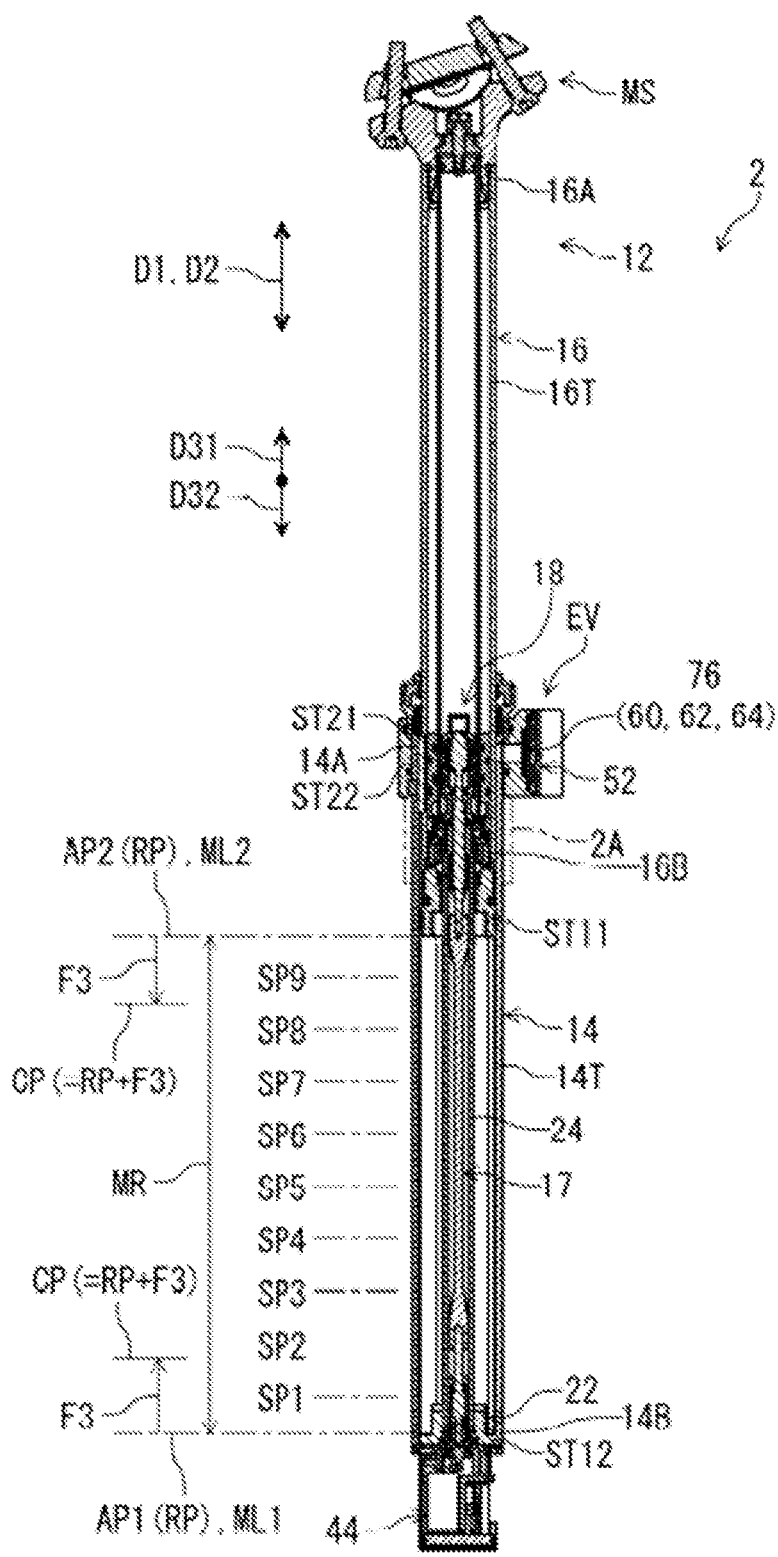
FIG. 2 is a cross-sectional view of the rider-posture changing device taken along line II-II of FIG. 1.

As seen in FIG. 2, the first member 14 includes a first end 14A and a first additional end 14B. The first member 14 extends from the first end 14A to the first additional end 14B in the longitudinal direction D1. The second member 16 includes a second end 16A and a second additional end 16B. The second member 16 extends from the second end 16A to the second additional end 16B in the longitudinal direction D1. The first end 14A of the first member 14 is provided above the first additional end 14B in a state where the rider-posture changing device 12 is mounted to the vehicle body 2A. The second end 16A of the second member 16 is provided above the second additional end 16B in a state where the rider-posture changing device 12 is mounted to the vehicle body 2A. Thus, the first end 14A can also be referred to as an upper end of the first member 14. The second end 16A can also be referred to as an upper end of the second member 16. The saddle mounting structure MS is attached to the second end 16A of the second member 16. However, the saddle mounting structure MS can be attached to other parts in the rider-posture changing device 12.

The rider-posture changing device 12 has a movable range MR. For example, the movable range MR is defined based on the second end 16A of the second member 16. The movable range MR is a range in which the second member 16 is movable relative to the first member 14 in the longitudinal direction D1. The movable range MR includes a first mechanical limit ML1 and a second mechanical limit ML2. The movable range MR is defined between the first mechanical limit ML1 and the second mechanical limit ML2 in the longitudinal direction D1.

The rider-posture changing device 12 includes a first stopper ST11, a first receiving member ST12, a second stopper ST21, and a second receiving member ST22. The first stopper ST11 is secured to the first end 14A of the first member 14. The first receiving member ST12 is attached to the second member 16. The second stopper ST21 is secured to the first additional end 14B of the first member 14. The second receiving member ST22 is attached to the second additional end 16B of the second member 16.

The second member 16 is at the first mechanical limit ML1 in a state where the first stopper ST11 is in contact with the first receiving member ST12. The second member 16 is at the second mechanical limit ML2 in a state where the second stopper ST21 is in contact with the second receiving member ST22. The first stopper ST11 and the first receiving member ST12 define the first mechanical limit ML1. The second stopper ST21 and the second receiving member ST22 define the second mechanical limit ML2.

Figure 3:
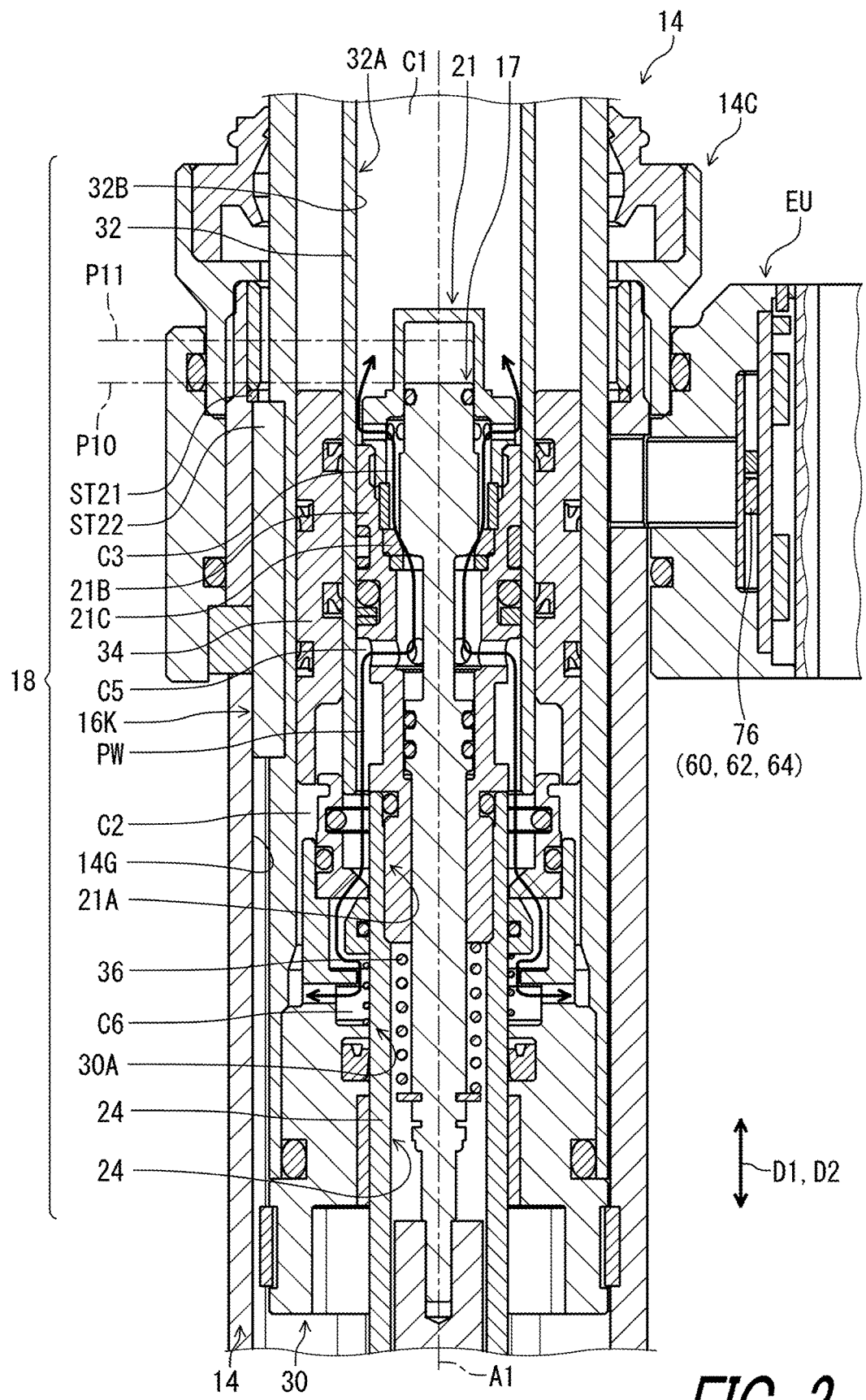
FIG. 3 is a partial cross-sectional view of the rider-posture changing device illustrated in FIG. 1.

As seen in FIG. 3, the rider-posture changing device 12 for the human-powered vehicle 2 comprises a first hydraulic chamber C1, a second hydraulic chamber C2, and a valve member 17. The second hydraulic chamber C2 is configured to be in fluid communication with the first hydraulic chamber C1. The valve member 17 is configured to control a fluid communication between the first hydraulic chamber C1 and the second hydraulic chamber C2. In the present embodiment, the rider-posture changing device 12 comprises a hydraulic structure 18. The hydraulic structure 18 includes the first hydraulic chamber C1, the second hydraulic chamber C2, and the valve member 17.

The hydraulic structure 18 includes a passageway PW. The passageway PW is provided between the first hydraulic chamber C1 and the second hydraulic chamber C2. The valve member 17 is configured to change the fluid communication state of the hydraulic structure 18 between a closed state where the valve member 17 closes the passageway PW and an open state where the valve member 17 opens the passageway PW. The first hydraulic chamber C1 and the second hydraulic chamber C2 are filled with a substantially incompressible fluid (e.g., oil).

The hydraulic structure 18 includes a valve structure 21. The valve member 17 is movable relative to the valve structure 21 between a closed position P10 and an open position P11 in the longitudinal direction D1. The hydraulic structure 18 is in the closed state when the valve member 17 is in the closed position P10. The hydraulic structure 18 is in an open state when the valve member 17 is in the open position P11.

The rider-posture changing device 12 has a lock state in which the first member 14 and the second member 16 are not movable relative to each other in the longitudinal direction D1. The rider-posture changing device 12 has an adjustable state in which the first member 14 and the second member 16 are movable relative to each other in the longitudinal direction D1. The rider-posture changing device 12 is in the lock state when the hydraulic structure 18 is in the closed state. The rider-posture changing device 12 is in the adjustable state when the hydraulic structure 18 is in the open state.

The first member 14 includes a cap structure 14C attached to the first tube 14T. The cap structure 14C includes the second stopper ST21. The second member 16 includes a plurality of keys 16K attached to the second tube 16T. The keys 16K are circumferentially arranged at regular intervals. The plurality of keys 16K includes the second receiving member ST22. The first member 14 includes a plurality of guide grooves 14G extending in the longitudinal direction D1. The key 16K is provided in the guide groove 14G to restrict the second member 16 from rotating relative to the first member 14.

Figure 4:
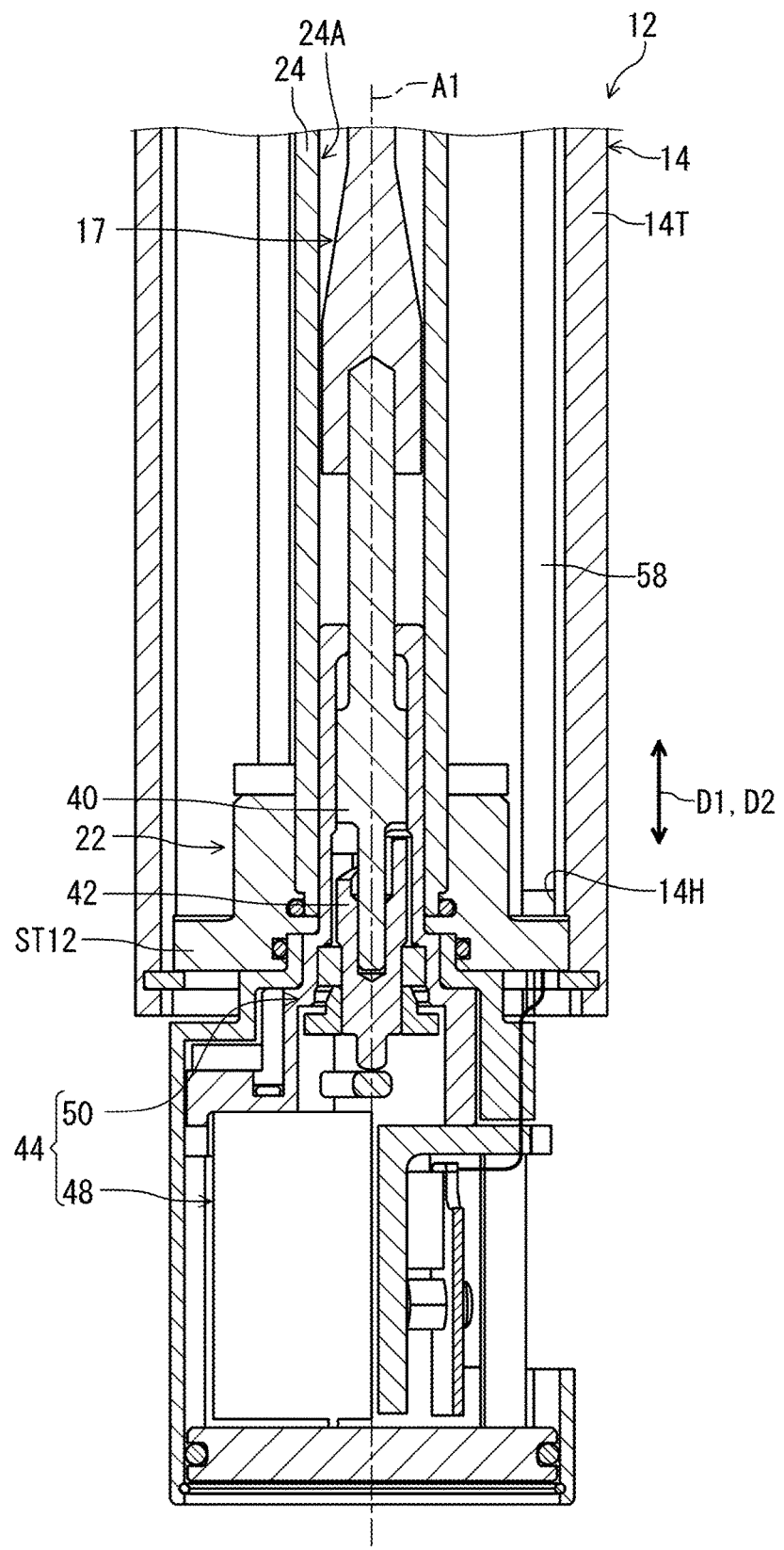
FIG. 4 is a partial cross-sectional view of the rider-posture changing device illustrated in FIG. 1.

As seen in FIG. 4, the hydraulic structure 18 includes a first support 22 and a first inner tube 24. The first support 22 is secured to the first additional end 14B of the first member 14. The first inner tube 24 is secured to the first support 22 and provided in the first member 14. The first inner tube 24 extends from the first support 22 in the longitudinal direction D1. The first support 22 includes the first receiving member ST12.

As seen in FIG. 3, the valve structure 21 is secured to an end of the first inner tube 24. The valve structure 21 includes an internal cavity 21A. The first inner tube 24 includes a cavity 24A. The valve member 17 is movably provided in the internal cavity 21A and the cavity 24A. The valve member 17 and the valve structure 21 define a valve chamber C3 in the internal cavity 21A.

Figure 5:
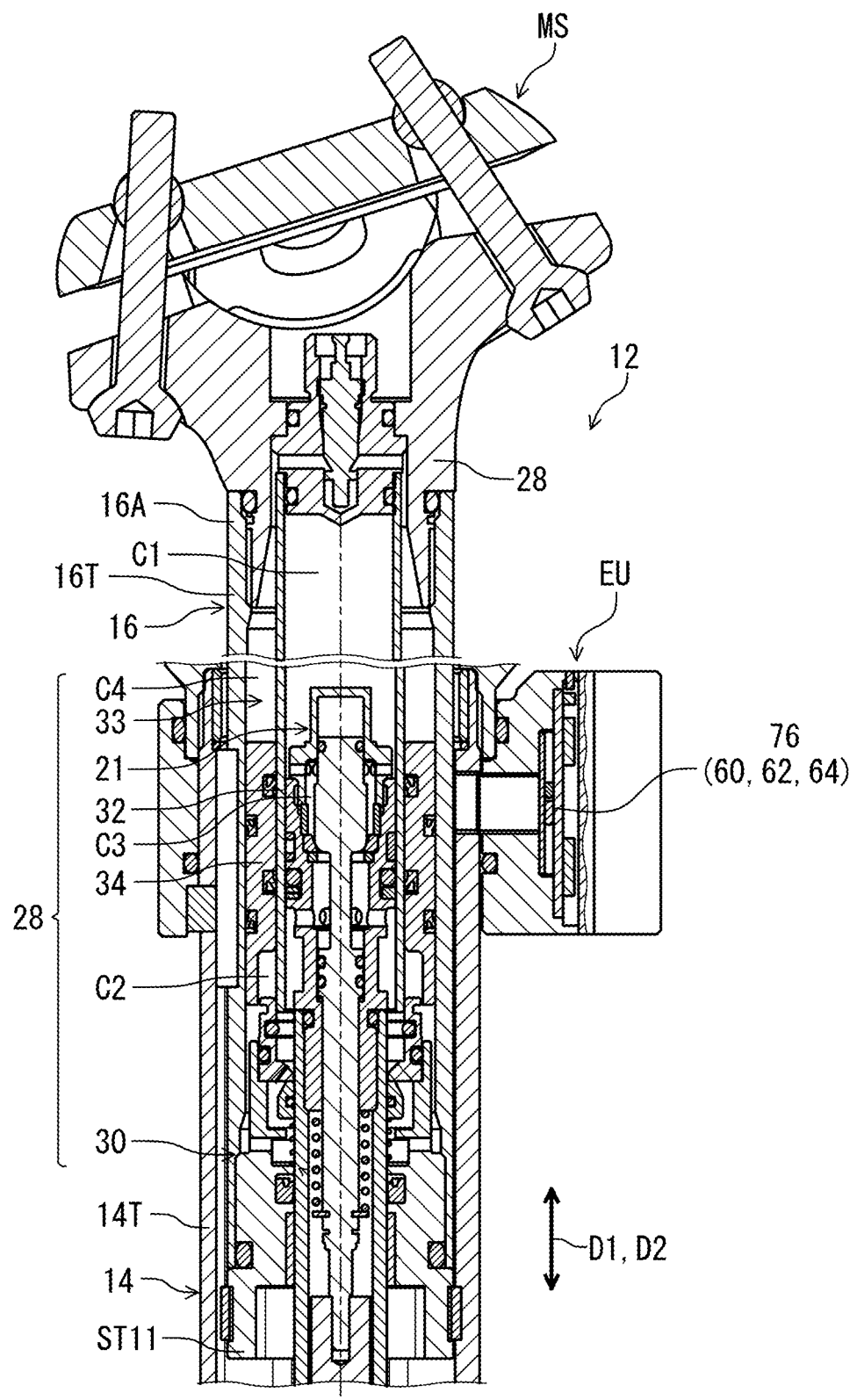
FIG. 5 is a partial cross-sectional view of the rider-posture changing device illustrated in FIG. 1.

As seen in FIG. 5, the hydraulic structure 18 includes a second support 28, an intermediate support 30, and a second inner tube 32. The second support 28 is secured to the second end 16A of the second member 16. The second support 28 is integrally provided with the saddle mounting structure MS and couples the saddle mounting structure MS to the second member 16. The intermediate support 30 is secured to the second additional end 16B of the second member 16. The second inner tube 32 is provided in the second member 16 and disposed between the second support 28 and the intermediate support 30. The second support 28 and the intermediate support 30 are secured to the second member 16 to hold the second inner tube 32 in the second member 16. The second member 16, the second inner tube 32, the second support 28, and the intermediate support 30 define an internal space 33. The intermediate support 30 includes the first stopper ST11.

The hydraulic structure 18 includes a floating piston 34. The floating piston 34 is movably provided in the internal space 33 to divide the internal space 33 into the second hydraulic chamber C2 and a biasing chamber C4. The biasing chamber C4 is filled with a compressible fluid (e.g., gas such as air) to produce biasing force to lengthen the rider-posture changing device 12. The compressible fluid is compressed in the biasing chamber C4 to produce the biasing force in a state where the second member 16 is at the first mechanical limit ML1 (see, e.g., FIG. 2).

As seen in FIG. 3, the intermediate support 30 includes a support opening 30A. The first inner tube 24 extends through the support opening 30A. The valve structure 21 is movably provided in a cavity 32A of the second inner tube 32. The valve structure 21 is in slidable contact with an inner peripheral surface 32B of the second inner tube 32. As seen in FIG. 5, the valve structure 21, the second inner tube 32, and the second support 28 define the first hydraulic chamber C1 in the second inner tube 32.

As seen in FIG. 3, the first inner tube 24, the valve structure 21, the second inner tube 32, and the intermediate support 30 define a first intermediate chamber C5 and a second intermediate chamber C6. The first hydraulic chamber C1 is in communication with the valve chamber C3 via at least one hole. The valve chamber C3 is configured to be in communication with the first intermediate chamber C5 via at least one hole. The first intermediate chamber C5 is in communication with the second intermediate chamber C6 via at least one hole. The second intermediate chamber C6 is in communication with the second hydraulic chamber C2 via at least one hole. The passageway PW includes the valve chamber C3, the first intermediate chamber C5, the second intermediate chamber C6, and the plurality of holes.

The valve structure 21 includes a valve base 21B and a valve seat 21C. The valve seat 21C is attached to the valve base 21B to be contactable with the valve member 17. The valve member 17 is in contact with the valve seat 21C to close the passageway PW in the closed state where the valve member 17 is in the closed position P10. The valve member 17 is spaced apart from the valve seat 21C to open the passageway PW in the open state where the valve member 17 is in the open position P11.

The rider-posture changing device 12 comprises a biasing member 36 to bias the valve member 17 toward the closed position P10. The biasing member 36 is provided in the first inner tube 24. For example, the biasing member 36 includes a spring.

The substantially incompressible fluid does not flow between the first hydraulic chamber C1 and the second hydraulic chamber C2 in the closed state where the valve member 17 closes the passageway PW. Thus, in the closed state, the first member 14 and the second member 16 are fixedly positioned relative to each other in the longitudinal direction D1.

The substantially incompressible fluid can flow between the first hydraulic chamber C1 and the second hydraulic chamber C2 through the passageway PW in the open state where the valve member 17 opens the passageway PW. For example, when the rider's weight is applied to the second member 16 in the open state, the substantially incompressible fluid flows from the first hydraulic chamber C1 to the second hydraulic chamber C2 through the passageway PW. Thus, the floating piston 34 is pressed toward the biasing chamber C4 relative to the first member 14, increasing a volume of the second hydraulic chamber C2 while the compressible fluid is compressed in the biasing chamber C4. This downwardly moves the second member 16 relative to the first member 14 against the basing force of the biasing chamber C4 while the rider's weight is applied to the second member 16, allowing the rider to lower the saddle using the rider's weight in the open state.

The compressible fluid compressed in the biasing chamber C4 biases the second member 16 to upwardly move relative to the first member 14 in the longitudinal direction D1 and to downwardly move the floating piston 34 in the longitudinal direction D1. When the rider's weight is released from the second member 16 in the open state, the substantially incompressible fluid flows from the second hydraulic chamber C2 to the first hydraulic chamber C1 through the passageway PW because of the biasing force of the biasing chamber C4. This upwardly moves the second member 16 relative to the first member 14 while the rider's weight is released from the second member 16, allowing the rider to lift the saddle by releasing the rider's weight in the open state.

Figure 6:
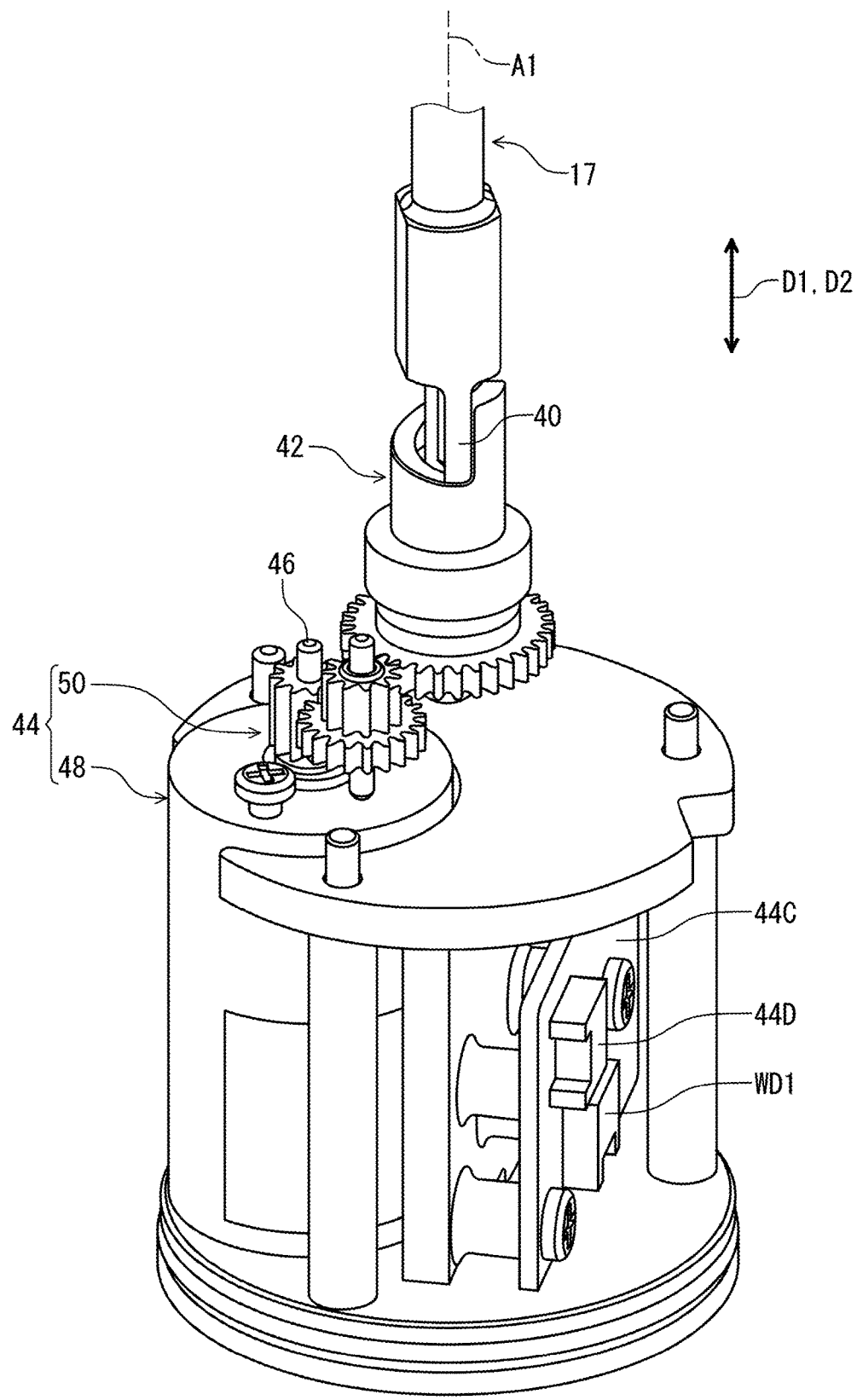
FIG. 6 is a partial perspective view of an internal structure of the rider-posture changing device illustrated in FIG. 1.

As seen in FIG. 6, the rider-posture changing device 12 for the human-powered vehicle 2 comprises a cam follower 40. The cam follower 40 is coupled to the valve member 17 so as to move the valve member 17. In the present embodiment, the cam follower 40 is integrally provided with at least part of the valve member 17 as a one-piece unitary member. However, the cam follower 40 can be a separate member from the valve member 17.

The rider-posture changing device 12 for the human-powered vehicle 2 comprises a cam member 42. The cam member 42 is rotatable about a rotational axis A1 to guide the cam follower 40 in a movement direction D2. Thus, the cam member 42 is rotatable about the rotational axis A1 to move the valve member 17 in the movement direction D2. The cam member 42 is rotatable about the rotational axis A1 to move the valve member 17 between the closed position P10 (see, e.g., FIG. 3) and the open position P11 (see, e.g., FIG. 3) in the movement direction D2. The cam member 42 includes a guide surface 42A configured to guide the cam follower 40 in the movement direction D2 in response to the rotation of the cam member 42.

In the present embodiment, the movement direction D2 is defined along the longitudinal direction D1. The movement direction D2 is defined parallel to the longitudinal direction D1. However, the movement direction D2 can be non-parallel to the longitudinal direction D1.

The rider-posture changing device 12 further comprises an actuator 44. The actuator 44 is configured to move one of the first member 14 and the second member 16 relative to another of the first member 14 and the second member 16. The actuator 44 is configured to make one of the first tube 14T and the second tube 16T movable relative to another of the first tube 14T and the second tube 16T. The actuator 44 is configured to move the valve member 17 between the closed position P10 (see, e.g., FIG. 3) and the open position P11 (see, e.g., FIG. 3) in the movement direction D2. The actuator 44 is configured to rotate the cam member 42 to move the valve member 17 between the closed position P10 (see, e.g., FIG. 3) and the open position P11 (see, e.g., FIG. 3) in the movement direction D2. The actuator 44 is configured to maintain the valve member 17 in each of the closed position P10 (see, e.g., FIG. 3) and the open position P11 (see, e.g., FIG. 3). Thus, the actuator 44 is configured to change a state of the rider-posture changing device 12 between the lock state and the adjustable state. The actuator 44 is configured to maintain each of the lock state and the adjustable state.

The actuator 44 includes at least one of a hydraulic device, a pneumatic device, an electric motor, a solenoid, a shape memory alloy, and a piezoelectric element. In the present embodiment, the actuator 44 includes a motor configured to move the second member 16 relative to the first member 14. However, the actuator 44 can include at least one of the hydraulic device, the pneumatic device, the solenoid, the shape memory alloy, and the piezoelectric element instead of or in addition to the motor.

The actuator 44 includes an output shaft 46 rotatable about an actuation rotational axis A2. The actuator 44 includes a motor 48 and a gear reducer 50. The motor 48 is configured to rotate the output shaft 46 about the actuation rotational axis A2. The output shaft 46 is coupled to a rotor of the motor 48. The gear reducer 50 is configured to reduce a rotational speed of the cam member 42 compared with a rotational speed of the output shaft 46. Examples of the motor 48 include a direct-current motor and a stepper motor.

Figure 7:
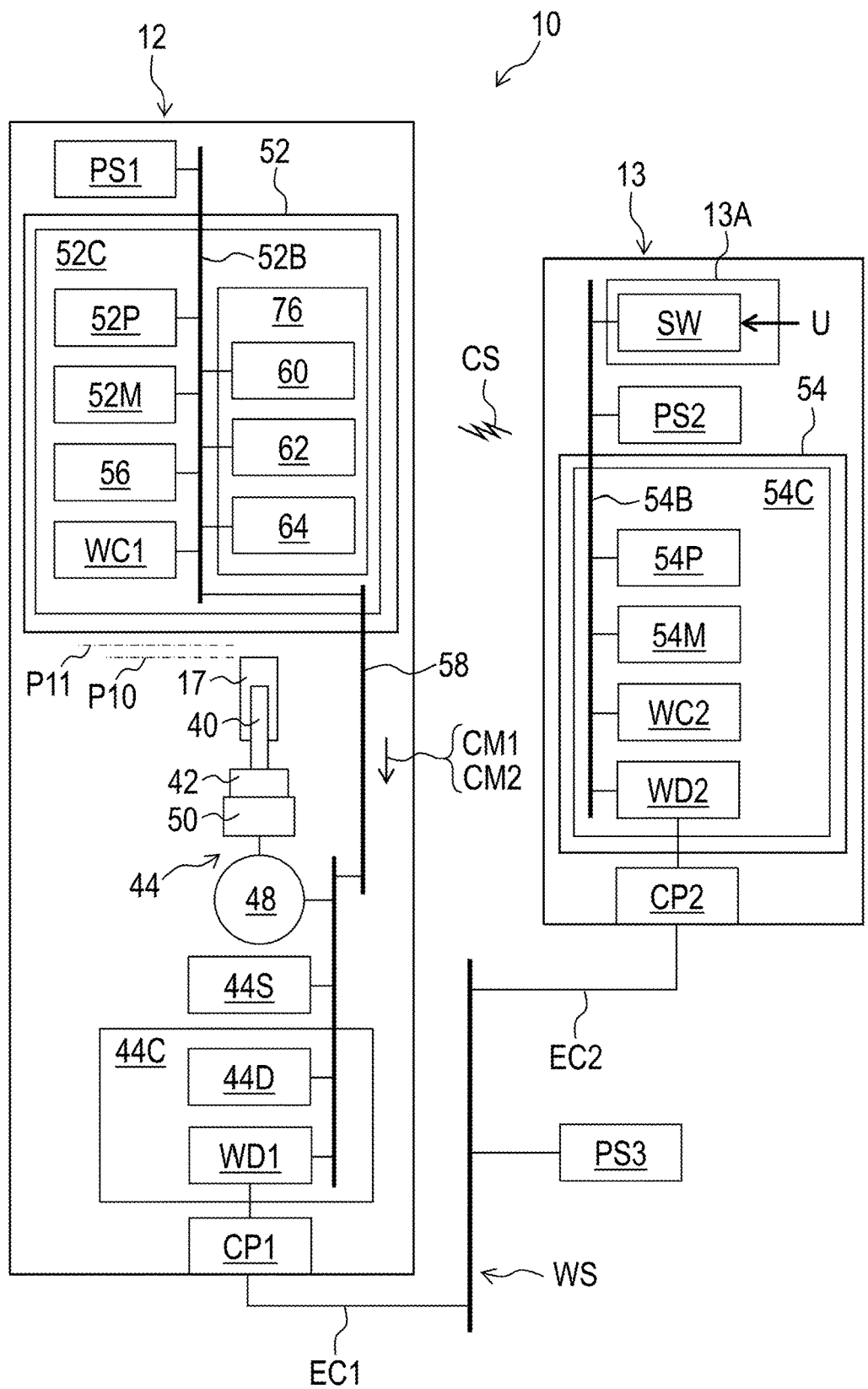
FIG. 7 is a schematic block diagram of the rider-posture changing device illustrated in FIG. 1.

As seen in FIG. 7, the rider-posture changing device 12 for the human-powered vehicle 2 comprises a controller 52. The controller 52 is configured to control the actuator 44 to move one of the first member 14 and the second member 16 relative to another of the first member 14 and the second member 16 in response to a control signal CS transmitted from the operating device 13. The controller 52 is configured to control the actuator 44 to move the second member 16 relative to the first member 14 in the longitudinal direction D1 in response to the control signal CS transmitted from the operating device 13. The controller 52 is configured to control the actuator 44 to rotate the cam member 42 in response to the control signal CS transmitted from the operating device 13.

The controller 52 includes a processor 52P, a memory 52M, a circuit board 52C, and a system bus 52B. The processor 52P includes a central processing unit (CPU) and a memory controller. The memory 52M is electrically connected to the controller 52. The memory 52M includes a read only memory (ROM) and a random-access memory (RAM). The ROM includes a non-transitory computer-readable storage medium. The RAM includes a transitory computer-readable storage medium. The memory 52M includes storage areas each having an address in the ROM and the RAM. The controller 52 controls the memory 52M to store data in the storage areas of the memory 52M and reads data from the storage areas of the memory 52M. The processor 52P and the memory 52M are electrically mounted on the circuit board 52C. The processor 52P and the memory 52M are electrically connected to the system bus 52B. The memory 52M (e.g., the ROM) stores a program. The program is read into the controller 52, and thereby the configuration and/or algorithm of the controller 52 is performed.

In the present embodiment, the operating device 13 includes a user interface 13A. The user interface 13A is configured to receive the user input U. The user interface 13A includes an electrical switch SW configured to be activated in response to the user input U. For example, the user interface 13A includes a push-button switch. However, the user interface 13A can include other user interfaces.

The operating device 13 includes a signal controller 54. The signal controller 54 is configured to generate the control signal CS in response to the user input U. The signal controller 54 is configured to generate the control signal CS when the electrical switch SW is pressed. The signal controller 54 includes a processor 54P, a memory 54M, a circuit board 54C, and a bus 54B. The processor 54P and the memory 54M are electrically mounted on the circuit board 54C. The processor 54P includes a CPU and a memory controller. The memory 54M is electrically connected to the processor 54P. The memory 54M includes a ROM and a RAM. The memory 54M includes storage areas each having an address in the ROM and the RAM. The processor 54P controls the memory 54M to store data in the storage areas of the memory 54M and reads data from the storage areas of the memory 54M. The circuit board 54C and the user interface 13A are electrically connected to the bus 54B. The user interface 13A is electrically connected to the processor 54P and the memory 54M with the bus 54B and the circuit board 54C. The memory 54M (e.g., the ROM) stores a program. The program is read into the processor 54R and thereby the configuration and/or algorithm of the signal controller 54 is performed.

The rider-posture changing device 12 further comprises a wireless communicator WC1. The wireless communicator WC1 is configured to wirelessly communicate with other wireless communicators. The operating device 13 includes an additional wireless communicator WC2 configured to wirelessly communicate with other wireless communicators. The controller 52 is configured to be connected to the wireless communicator WC1 to wirelessly communicate with the additional wireless communicator WC2. The signal controller 54 is configured to be connected to the additional wireless communicator WC2 to wirelessly communicate with the wireless communicator WC1. The additional wireless communicator WC2 is configured to transmit the control signal CS generated by the signal controller 54 through a wireless communication channel. The wireless communicator WC1 is configured to receive the control signal CS from the additional wireless communicator WC2 through the wireless communication channel.

The wireless communicator WC1 is electrically mounted on the circuit board 52C of the controller 52. The wireless communicator WC1 is electrically connected to the processor 52P and the memory 52M through the circuit board 52C and the system bus 52B. The wireless communicator WC1 is configured to transmit, to the controller 52, the control signal CS transmitted from the operating device 13. The wireless communicator WC1 includes a signal transmitting circuit, a signal receiving circuit, and an antenna. The additional wireless communicator WC2 includes a signal transmitting circuit, a signal receiving circuit, and an antenna. Thus, the wireless communicator WC1 can also be referred to as a wireless communication circuit or circuitry. The additional wireless communicator WC2 substantially the same structure as that of the wireless communicator WC1. Thus, the additional wireless communicator WC2 can also be referred to as an additional wireless communication circuit or circuitry.

The rider-posture changing device 12 further comprises an informing device 56. The informing device 56 is configured to inform a user of information relating to the rider-posture changing device 12. The informing device 56 is configured to be electrically connected to the controller 52 and the wireless communicator WC1. The informing device 56 is electrically mounted on the circuit board 52C. Examples of the information relating to the rider-posture changing device 12 include a communication status of the wireless communicator WC1.

In the present embodiment, the informing device 56 includes a light emitting unit configured to emit light indicating the information relating to the rider-posture changing device 12. The light emitting unit includes a light-emitting diode (LED). However, the informing device 56 can include other devices instead of or in addition to the light emitting unit.

The rider-posture changing device 12 further comprises an electric power source PS1. The electric power source PS1 is configured to supply electric power to the rider-posture changing device 12. The electric power source PS1 is configured to be electrically connected to the actuator 44, the controller 52, the wireless communicator WC1, and the informing device 56. The electric power source PS1 is configured to supply electric power to the actuator 44, the controller 52, the wireless communicator WC1, and the informing device 56.

The operating device 13 includes an electric power source PS2. The electric power source PS2 is configured to supply electric power to the signal controller 54 and the additional wireless communicator WC2. The electric power source PS2 is configured to be electrically connected to the signal controller 54 and the additional wireless communicator WC2.

The control system 10 includes an electric power source PS3 and an electric wiring structure WS. The electric power source PS3 is configured to supply electric power to the rider-posture changing device 12 and the operating device 13 through the electric wiring structure WS. Examples of the electric power sources PS1, PS2, and PS3 includes a primary battery and a secondary battery.

The rider-posture changing device 12 includes a wired communicator WD1 and a connection port CP1. The wired communicator WD1 is configured to communicate with other wired communicators through a wired communication channel. The connection port CP1 is configured to be electrically connected with an electric cable EC1 included in the electric wiring structure WS. The connection port CP1 is configured to receive electric power from the electric power source PS3 through the electric cable EC1.

The operating device 13 includes an additional wired communicator WD2 and an additional connection port CP2. The additional wired communicator WD2 is configured to communicate with other wired communicators through a wired communication channel. The additional connection port CP2 is configured to be electrically connected with an additional electric cable EC2 included in the electric wiring structure WS. The wired communicator WD1 is configured to communicate with the additional wired communicator WD2 through the wired communication channel constituted by the electric cables EC1 and EC2. The additional connection port CP2 is configured to receive electric power from the electric power source PS3 through the additional electric cable EC2.

The wired communicator WD1 and the additional wired communicator WD2 are configured to communicate with each other using power line communication technology. The electric wiring structure WS includes a ground line and a voltage line that are detachably connected to a serial bus that is formed by communication interfaces. Electric power is supplied from the rider-posture changing device 12 and the operating device 13 via the voltage line. In the present embodiment, the rider-posture changing device 12 and the operating device 13 can all communicate with each other through the voltage line using the power line communication technology.

Power line communication (PLC) carries data on a conductor that is also used simultaneously for electric power transmission or electric power distribution to electric components. The PLC uses unique identifying information such as a unique identifier that is assigned to each of the rider-posture changing device 12 and the operating device 13. Based on the unique identifying information, each of the wired communicator WD1 and the additional wired communicator WD2 can recognize control signals which are necessary for itself among control signals transmitted via the included in the electric wiring structure WS.

If the wired communicator WD1 is electrically connected to the additional wired communicator WD2 through the electric wiring structure WS, the controller 52 is configured to receive the control signal CS from the operating device 13 through the electric wiring structure WS and the wired communicator WD1 without the wireless communicator WC1. If the wired communicator WD1 is not electrically connected to the additional wired communicator WD2 through the electric wiring structure WS, the controller 52 is configured to wirelessly receive the control signal CS from the operating device 13 through the wireless communicator WC1.

The rider-posture changing device 12 is configured to communicate with the operating device 13 though each of the wireless communication channel and the wired communication channel. The rider-posture changing device 12 is configured such that one of the wireless communication channel and the wired communication channel can be preferentially used over the other of the wireless communication channel and the wired communication channel. However, one of the wireless communicator WC1 and the wired communicator WD1 can be omitted from the rider-posture changing device 12 if needed and/or desired.

The actuator 44 includes a position sensor 44S, a motor driver 44D, and an additional circuit board 44C. The motor driver 44D and the wired communicator WD1 are electrically mounted on the additional circuit board 44C. The motor 48 is electrically connected to the position sensor 44S and the motor driver 44D through the additional circuit board 44C. The position sensor 44S is configured to sense that a rotational angle of the cam member 42. Examples of the position sensor 44S include a potentiometer and a rotary encoder. In the present embodiment, the position sensor 44S is configured to sense an absolute rotational position of the cam member 42. The motor driver 44D is configured to control the motor 48 based on the control signal CS and the rotational position sensed by the position sensor 44S.

The additional circuit board 44C of the actuator 44 is electrically connected to the circuit board 52C of the controller 52. The rider-posture changing device 12 includes an intermediate wiring structure 58. The additional circuit board 44C of the actuator 44 is electrically connected to the circuit board 52C of the controller 52 with the intermediate wiring structure 58.

As seen in FIG. 1, the intermediate wiring structure 58 extends in the longitudinal direction D1. As seen in FIG. 4, the first member 14 includes a groove 14H extending in the longitudinal direction D1. The intermediate wiring structure 58 is provided in the groove 14H.

As seen in FIG. 7, the controller 52 is configured to generate an open command CM1 based on the control signal CS and additional information. The motor driver 44D is configured to control the motor 48 to move the valve member 17 from the closed position P10 to the open position P11 in response to the open command CM1. The controller 52 is configured to generate a close command CM2 based on the control signal CS and additional information. The motor driver 44D is configured to control the motor 48 to move the valve member 17 from the open position P11 to the closed position P10 in response to the close command CM2.

As seen in FIG. 2, the rider-posture changing device 12 for the human-powered vehicle 2 comprises a first detector 60. The first detector 60 is configured to detect first information F1 indicating whether the second member 16 reaches an absolute position AP1 or not. The controller 52 is configured to store the absolute position AP1. In the present embodiment, the absolute position AP1 is substantially coincident with the first mechanical limit ML1. However, the absolute position AP1 can be offset from the first mechanical limit ML1.

The rider-posture changing device 12 further comprises a first additional detector 62. The first additional detector 62 is configured to detect first additional information F2 indicating whether the second member 16 reaches an additional absolute position AP2 or not. The additional absolute position AP2 is spaced apart from the absolute position AP1 in the longitudinal direction D1. The controller 52 is configured to store the additional absolute position AP2. In the present embodiment, the additional absolute position AP2 is substantially coincident with the second mechanical limit ML2. However, the additional absolute position AP2 can be offset from the second mechanical limit ML2.

The rider-posture changing device 12 for the human-powered vehicle 2 comprises a second detector 64. The second detector 64 is configured to detect second information F3 indicating a movement distance of the second member 16 from a reference position RP in the longitudinal direction D1. The controller 52 is configured to store the second information F3 and the reference position RP. The reference position RP can be one of the absolute position AP1 and the additional absolute position AP2.

The second detector 64 is configured to detect a moving direction of the second member 16 relative to the first member 14 in addition to the movement distance of the second member 16. Namely, the second information F3 indicate the movement distance and the moving direction of the second member 16 relative to the first member 14. The second detector 64 is configured to detect a first moving direction D31 of the second member 16 when the second member 16 is moved relative to the first member 14 toward the additional absolute position AP2. The second detector 64 is configured to detect a second moving direction D32 of the second member 16 when the second member 16 is moved relative to the first member 14 toward the absolute position AP1. The second moving direction D32 is an opposite direction of the first moving direction D31. The first moving direction D31 and the second moving direction D32 are parallel to the longitudinal direction D1.

The second detector 64 is configured to detect a movement distance as a positive value when the second detector 64 detects the first moving direction D31. The second detector 64 is configured to detect a movement distance as a negative value when the second detector 64 detects the second moving direction D32. Thus, the first moving direction D31 is a positive direction of the movement distance of the second member 16 relative to the first member 14. The second moving direction D32 is a negative direction of the movement distance of the second member 16 relative to the first member 14. The second detector 64 is configured to obtain the second information F3 by integrating the detected movement distance (the positive value and/or the negative value) of the second member 16 until the second information F3 is reset to zero. The relationship between the moving direction and the positive or negative value can be changed by setting, for example.

The controller 52 is configured to obtain a current position CP of the second member 16 relative to the first member 14 based on the second information F3 and the reference position RP. The controller 52 is configured to add the second information F3 to the reference position RP to obtain the current position CP. The controller 52 is configured to store the calculated current position CP.

Figure 8:
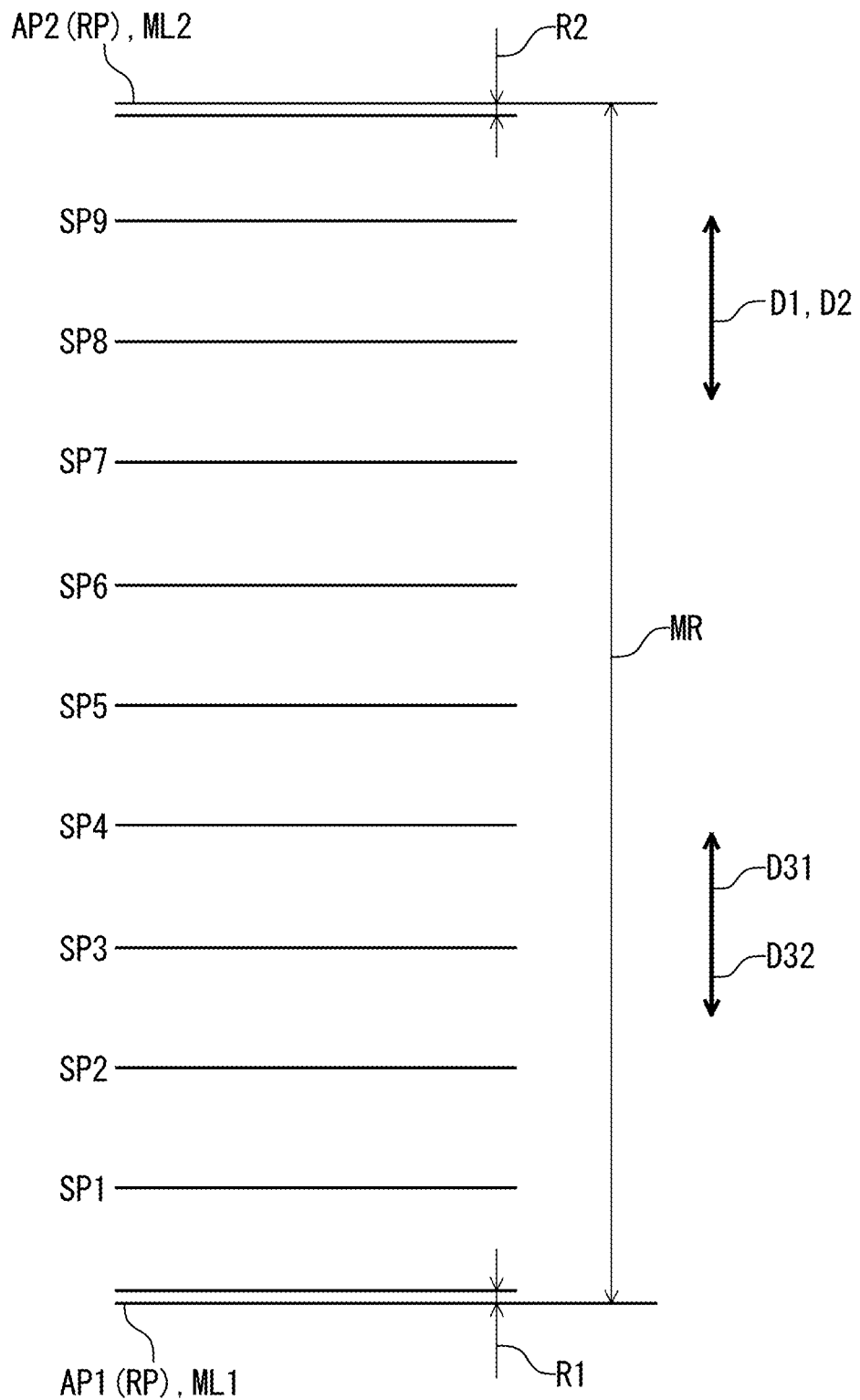
FIG. 8 is a schematic diagram indicating positions defined in the rider-posture changing device illustrated in FIG. 1.

As seen in FIG. 8, the controller 52 is configured to store the absolute position AP1 as the reference position RP in accordance with the first information F1. The controller 52 is configured to store the absolute position AP1 as the reference position RP if the first information F1 indicates that the second member 16 is in a position within a predetermined range R1 including the absolute position AP1.

In the present embodiment, the controller 52 is configured to conclude that the second member 16 reaches the absolute position AP1 if the second member 16 is in a position within the predetermined range R1. The controller 52 is configured to store the absolute position AP1 as the reference position RP if the second member 16 is in a position within the predetermined range R1. The absolute position AP1 is in an end of the predetermined range R1. However, the absolute position AP1 can be defined in a position other than the end of the predetermined range R1. The predetermined range R1 can be defined as only the absolute position AP1.

The controller 52 is configured to reset the second information F3 in accordance with the first information F1. The controller 52 is configured to reset the second information F3 if the first information F1 indicates that the second member 16 is in a position within the predetermined range R1 including the absolute position AP1. The absolute position AP1 is provided in the predetermined range R1. The controller 52 is configured to reset the second information F3 to zero if the first information F1 indicates that the second member 16 is in a position within the predetermined range R1. Thus, if the first information F1 indicates that the second member 16 is in a position within the predetermined range R1 including the absolute position AP1, the controller 52 is configured to add the second information F3 to the absolute position AP1 to obtain the current position CP.

The controller 52 is configured to store the additional absolute position AP2 as the reference position RP in accordance with the first additional information F2. The controller 52 is configured to store the additional absolute position AP2 as the reference position RP if the first information F1 indicates that the second member 16 is in a position within an additional predetermined range R2 including the additional absolute position AP2. The additional predetermined range R2 is spaced apart from the predetermined range R1 in the longitudinal direction D1.

In the present embodiment, the controller 52 is configured to conclude that the second member 16 reaches the additional absolute position AP2 if the second member 16 is in a position within the additional predetermined range R2. The controller 52 is configured to store the additional absolute position AP2 as the reference position RP if the second member 16 is in a position within the additional predetermined range R2. The additional absolute position AP2 is in an end of the additional predetermined range R2. However, the additional absolute position AP2 can be defined in a position other than the end of the additional predetermined range R2. The additional predetermined range R2 can be defined as only the additional absolute position AP2.

The controller 52 is configured to reset the second information F3 in accordance with the first additional information F2. The controller 52 is configured to reset the second information F3 if the first information F1 indicates that the second member 16 is in a position within the additional predetermined range R2 including the additional absolute position AP2. The additional absolute position AP2 is provided in the additional predetermined range R2. The controller 52 is configured to reset the second information F3 to zero if the first information F1 indicates that the second member 16 is in a position within the additional predetermined range R2 including the additional absolute position AP2. Thus, if the first additional information F2 indicates that the second member 16 is in a position within the additional predetermined range R2 including the additional absolute position AP2, the controller 52 is configured to add the second information F3 to the additional absolute position AP2 to obtain the current position CP.

The movable range MR includes a plurality of stop positions SP1 to SP9 in which the controller 52 is configured to control the actuator 44 to stop the second member 16 relative to the first member 14. The controller 52 is configured to control the actuator 44 to stop the second member 16 relative to the first member 14 when the second member 16 reaches one of the plurality of stop positions SP1 to SP9. The absolute position AP1, the additional absolute position AP2, and the plurality of stop positions SP1 to SP9 are arranged at regular intervals in the longitudinal direction D1. A total number of the stop positions SP1 to SP9 is not limited to the present embodiment.

As seen in FIG. 1, the rider-posture changing device 12 further comprises a first detection object 70. The first detection object 70 is provided to at least one of the first member 14 and the second member 16. The first detector 60 is configured to detect the first detection object 70 to obtain the first information F1. The first detector 60 includes a non-contact detector configured to detect the first detection object 70 to obtain the first information F1 without contacting the first detection object 70. In the present embodiment, the first detector 60 is provided to the first member 14. The first detection object 70 is provided to the second member 16. The first detection object 70 is provided on an outer peripheral surface of the second member 16. However, the first detector 60 and the first detection object 70 can be provided to other portions of the rider-posture changing device 12. The first detector 60 can include other detectors such as a contact detector.

Figure 9:
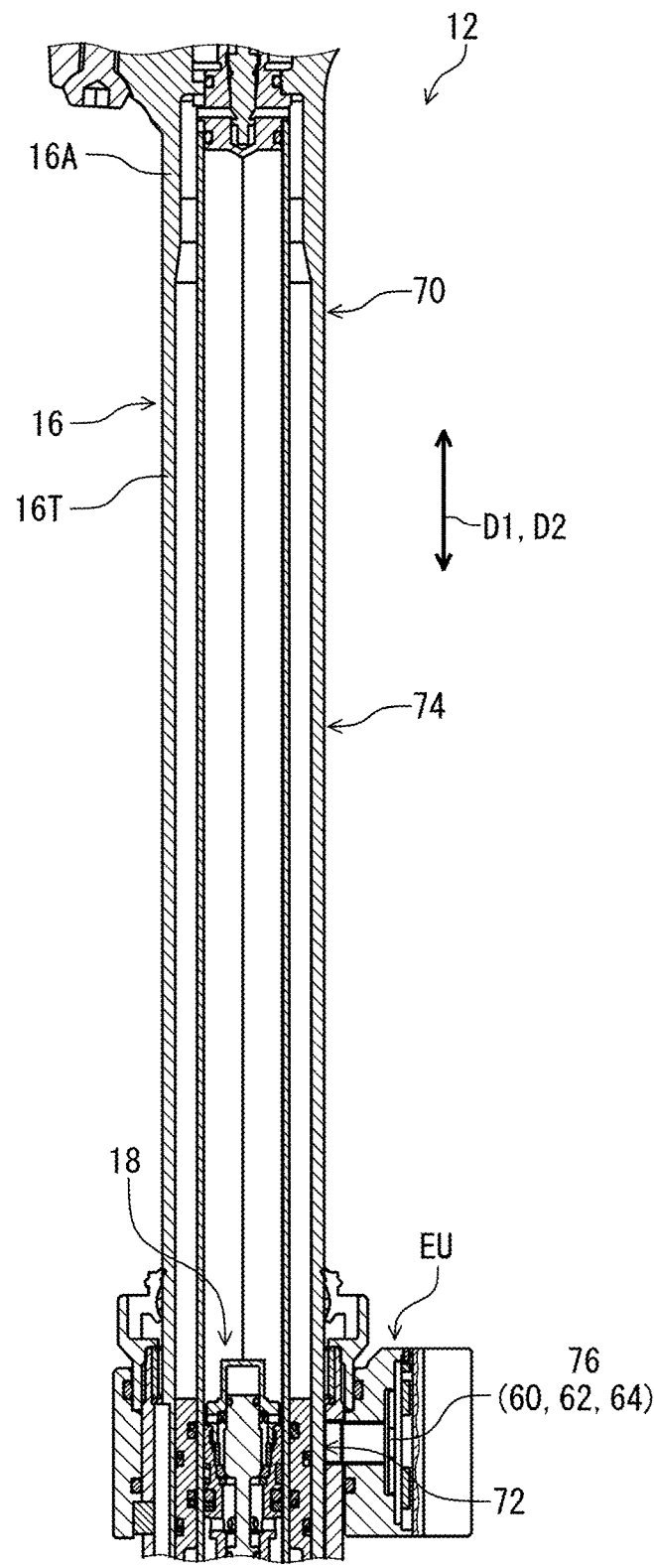
FIG. 9 is a partial cross-sectional view of the rider-posture changing device illustrated in FIG. 1.

As seen in FIG. 9, the rider-posture changing device 12 further comprises a first additional detection object 72. The first additional detection object 72 is provided to at least one of the first member 14 and the second member 16. The first additional detector 62 is configured to detect the first additional detection object 72 to obtain the first additional information F2. The first additional detector 62 includes a non-contact detector configured to detect the first additional detection object 72 to obtain the first additional information F2 without contacting the first additional detection object 72. In the present embodiment, the first additional detector 62 is provided to the first member 14. The first additional detection object 72 is provided to the second member 16. The first additional detection object 72 is provided on the outer peripheral surface of the second member 16. However, the first additional detector 62 and the first additional detection object 72 can be provided to other portions of the rider-posture changing device 12. The first additional detector 62 can include other detectors such as a contact detector.

As seen in FIG. 1, the rider-posture changing device 12 further comprises a second detection object 74. The second detection object 74 is provided to at least one of the first member 14 and the second member 16. The second detector 64 is configured to detect the second detection object 74 to obtain the second information F3. The second detector 64 includes a non-contact detector configured to detect the second detection object 74 to obtain the second information F3 without contacting the second detection object 74. In the present embodiment, the second detector 64 is provided to the first member 14. The second detection object 74 is provided to the second member 16. The second detection object 74 is provided on the outer peripheral surface of the second member 16. However, the second detector 64 and the second detection object 74 can be provided to other portions of the rider-posture changing device 12. The second detector 64 can include other detectors such as a contact detector.

Figure 10:
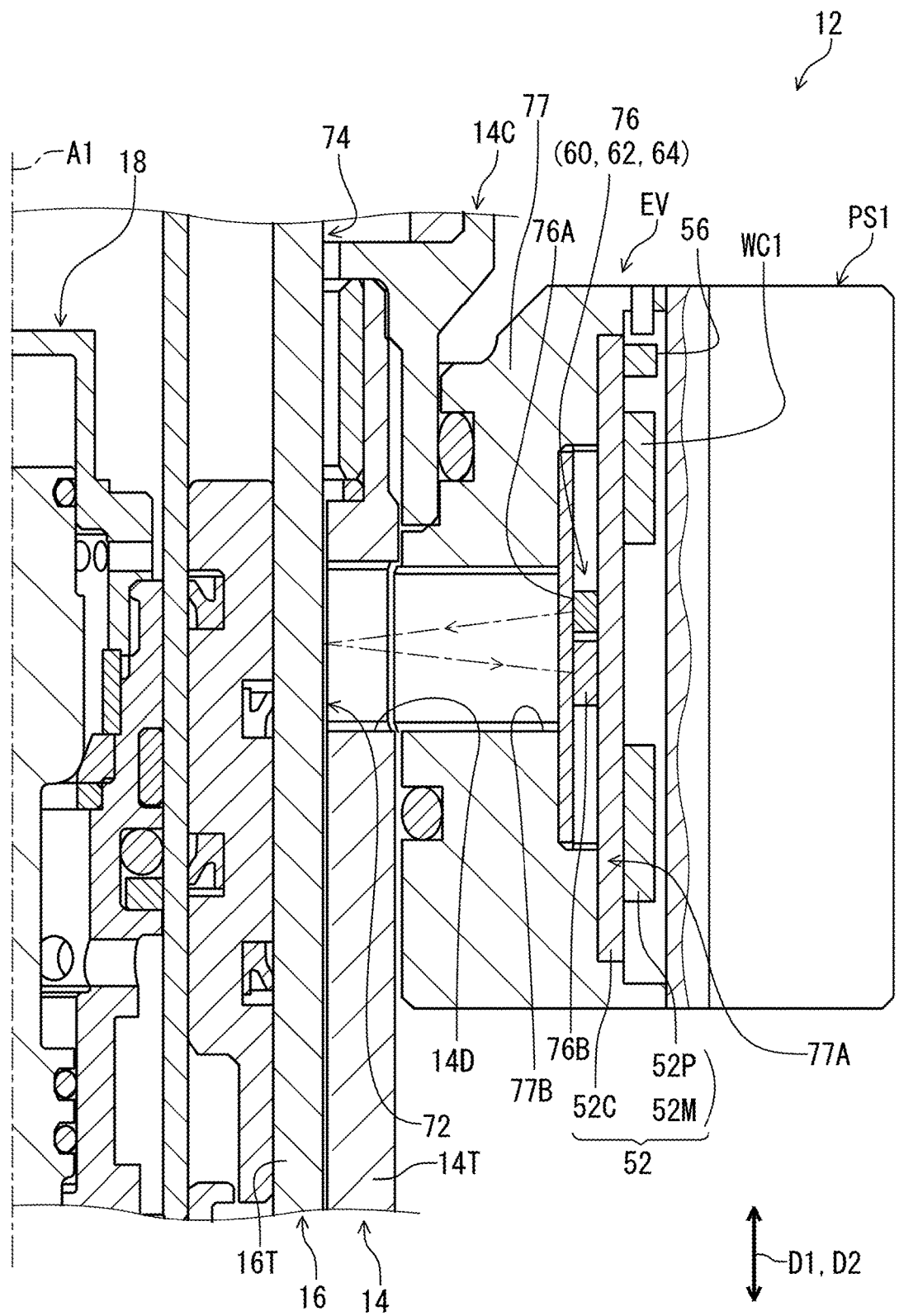
FIG. 10 is a partial cross-sectional view of the rider-posture changing device illustrated in FIG. 1.

As seen in FIG. 10, in the present embodiment, the first detector 60 and the second detector 64 are integrally provided with each other as a single unit. The first detector 60, the first additional detector 62, and the second detector 64 are integrally provided with each other as a single unit. However, at least one of the first detector 60, the first additional detector 62, and the second detector 64 can be a separate unit from another.

The first detector 60, the first additional detector 62, and the second detector 64 constitute an optical sensor 76. The optical sensor 76 is configured to detect a movement distance and a moving direction of the second member 16 relative to the first member 14. Examples of the optical sensor 76 include an optical tracking sensor. The optical sensor 76 includes a light emitter 76A and a light receiver 76B. The light emitter 76A is configured to emit light to the second member 16. For example, the light emitter 76A includes a laser unit configured to emit laser light. The light receiver 76B is configured to receive light reflected by one of the first detection object 70 (see, e.g., FIG. 9), the first additional detection object 72, and the second detection object 74. The light receiver 76B is configured to periodically generate image data based on light reflected by one of the first detection object 70 (see, e.g., FIG. 9), the first additional detection object 72, and the second detection object 74. The light receiver 76B is configured to periodically compare image data to obtain the movement distance and the moving direction of the second member 16 per unit time. For example, the light receiver 76B includes an image sensor and an image processor. The image sensor is configured to convert light to signals. The image processor is configured to convert the signals of the image sensor to image data and compare image data to obtain the movement distance and the moving direction of the second member 16 per unit time. Examples of the image sensor include a CMOS image sensor and a CCD image sensor. The controller 52 is configured to periodically receive the movement distance and the moving direction from the light receiver 76B.

The rider-posture changing device 12 includes a mounting member 77 mounted to the first member 14. The mounting member 77 is secured to an outer peripheral surface of the first member 14. The mounting member 77 includes a recess 77A. The first detector 60, the first additional detector 62, the second detector 64, the controller 52, the wireless communicator WC1, and the informing device 56 are provided in the recess 77A of the mounting member 77. The circuit board 52C is secured to the mounting member 77.

The first member 14 includes a first opening 14D provided radially outward of the second member 16. The mounting member 77 includes a second opening 77B. The second opening 77B connects the recess 77A to the first opening 14D. The light emitted from the light emitter 74A passes through the second opening 77B and the first opening 14D. The light reflected by one of the first detection object 70, the first additional detection object 72, and the second detection object 74 passes through the first opening 14D and the second opening 77B.

As seen in FIG. 9, for example, the first detection object 70 includes a first detection pattern such that the light receiver 76B detects the first information F1 indicating the second member 16 reaches the absolute position AP1. The first additional detection object 72 includes a first additional pattern such that the light receiver 76B detects the first additional information F2 indicating the second member 16 reaches the additional absolute position AP2. For example, the first pattern of the first detection object 70 is different from the first additional pattern of the first additional detection object 72.

In the present embodiment, the first pattern of the first detection object 70 includes a low-reflection part configured not to reflect light emitted from the light emitter 76A. The first additional pattern of the first additional detection object 72 includes a low-reflection part configured not to reflect light emitted from the light emitter 76A. The low-reflection part of the first detection object 70 has a reflection ratio different from a reflection ratio of the low-reflection part of the first additional detection object 72. Thus, the light receiver 76B is configured to separately detect each of the first information F1 and the first additional information F2.

The second detection object 74 includes a second pattern such that the light receiver 76B detects the movement distance and the moving direction of the second member 16. The second patter of the second detection object 74 is different from the first pattern of the first detection object 70 and the first additional pattern of the first additional detection object 72. A reflection ratio of the second detection object 74 is higher than the reflection ratio of the first detection object 70 and the reflection ratio of the first additional detection object 72. The light receiver 76B is configured to detect the movement distance and the moving direction of the second member 16 based on difference between images periodically generated based on light reflected by the second detection object 74.

As seen in FIG. 10, the rider-posture changing device 12 further comprises an electrical unit EU. The electrical unit EU is mounted to one of the first member 14 and the second member 16. The electrical unit EU is detachably attached to one of the first member 14 and the second member 16. The electrical unit EU includes at least one of the first detector 60, the second detector 64, the controller 52, the wireless communicator WC1, and the informing device 56. The electrical unit EU includes at least one of the first detector 60, the first additional detector 62, the second detector 64, the controller 52, the wireless communicator WC1, and the informing device 56.

In the present embodiment, the electrical unit EU is mounted to the first member 14. The electrical unit EU is mounted to the first end 14A of the first member 14. The electrical unit EU is mounted to the upper end of the first member 14. The electrical unit EU is detachably attached to the first member 14. The electric power source PS1 is detachably attached to the mounting member 77.

The at least one of the first detector 60, the second detector 64, the controller 52, the wireless communicator WC1, and the informing device 56 provides a single unit configured to be detachably attached to the first member 14 as the single unit. The at least one of the first detector 60, the first additional detector 62, the second detector 64, the controller 52, the wireless communicator WC1, and the informing device 56 provides the single unit configured to be detachably attached to the first member 14 as the single unit.

In the present embodiment, the electrical unit EU includes the first detector 60, the first additional detector 62, the second detector 64, the controller 52, the wireless communicator WC1, and the informing device 56. The first detector 60, the first additional detector 62, the second detector 64, the controller 52, the wireless communicator WC1, and the informing device 56 provide the single unit configured to be detachably attached to the first member 14 as the single unit. The circuit board 52C of the controller 52 is detachably attached to the first member 14. The first detector 60, the first additional detector 62, the second detector 64, the wireless communicator WC1, and the informing device 56 are electrically mounted on the circuit board 52C. However, at least one of the first detector 60, the first additional detector 62, the second detector 64, the controller 52, the wireless communicator WC1, and the informing device 56 can be omitted from the single unit.

Figure 11:
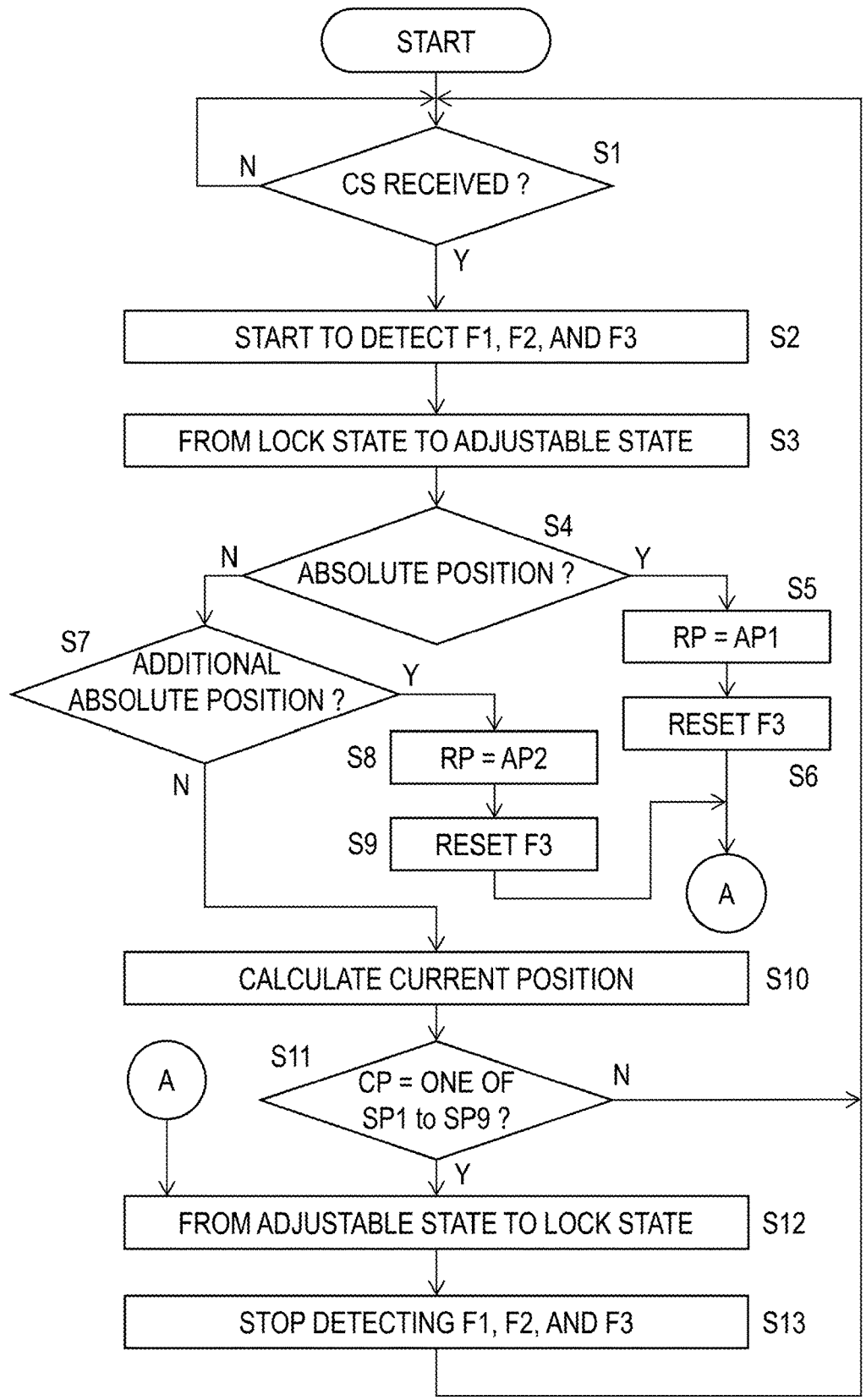
FIG. 11 is a flow chart of the rider-posture changing device illustrated in FIG. 1.

The control executed by the controller 52 will be described below referring to FIG. 11. As seen in FIG. 11, the controller 52 determines whether the control signal CS is received or not (step S1). The controller 52 keeps monitoring the control signal CS if the controller 52 concludes that the control signal CS is not received (step S1). The controller 52 controls the first detector 60, the first additional detector 62, and the second detector 64 to start to detect the first information F1, the first additional information F2, and the second information F3 if the controller 52 concludes that the control signal CS is received (steps S1 and S2). The controller 52 controls the actuator 44 to change the state of the rider-posture changing device 12 from the lock state to the adjustable state (step S3). Specifically, the controller 52 controls the actuator 44 to move the valve member 17 from the closed position P10 to the open position P11. Thus, the first member 14 and the second member 16 are movable relative to each other in the longitudinal direction D1 in the adjustable state. For example, the second member 16 is moved relative to the first member 14 in the second moving direction D32 when the rider's weight is applied to the second member 16 through the saddle mounted to the saddle mounting structure MS. The second member 16 is moved relative to the first member 14 in the first moving direction D31 by the biasing force of the compressible fluid in the biasing chamber C4 when the rider's weight is released from the second member 16.

The controller 52 determines whether the first detector 60 detects the first information F1 indicating the second member 16 reaches the absolute position AP1 or not (step S4). Specifically, the controller 52 determines whether the first detector 60 detects the first information F1 indicating the second member 16 is in a position within the predetermined range R1 including the absolute position AP1 or not. The controller 52 stores the absolute position AP1 as the reference position RP if the first information F1 indicates that the second member 16 reaches the absolute position AP1 (steps S4 and S5). The controller 52 resets the second information F3 if the first information F1 indicates that the second member 16 reaches the absolute position AP1 (steps S4 and S6). The process enters step S12.

The controller 52 determines whether the first additional detector 62 detects the first additional information F2 indicating the second member 16 reaches the additional absolute position AP2 or not if the first information F1 does not indicate that the second member 16 reaches the absolute position AP1 (steps S4 and S7). Specifically, the controller 52 determines whether the first additional detector 62 detects the first additional information F2 indicating the second member 16 is in a position within the additional predetermined range R2 including the additional absolute position AP2 or not. The controller 52 stores the additional absolute position AP2 as the reference position RP if the first additional information F2 indicates that the second member 16 reaches the additional absolute position AP2 (steps S7 and S8). The controller 52 resets the second information F3 if the first additional information F2 indicates that the second member 16 reaches the additional absolute position AP2 (steps S7 and S9). The process enters step S12.

The controller 52 calculates the current position CP based on the reference position RP and the second information F3 (step S10). Specifically, the controller 52 adds the second information F3 to the reference position RP to obtain the current position CR The controller 52 compares the current position CP with each of the stop positions SP1 to SP9. The controller 52 controls the actuator 44 to change the state of the rider-posture changing device 12 from the adjustable state to the lock state if the current position CP is coincident with one of the stop positions SP1 to SP9 (steps S11 and S12). Thus, the second member 16 is stopped in one of the absolute position AP1, the additional absolute position AP2, and the stop positions SP1 to SP9. The controller 52 controls the first detector 60, the first additional detector 62, and the second detector 64 to stop detecting the first information F1, the first additional information F2, and the second information F3 (step S13). The process returns to the step S1.

As seen in FIG. 11, the controller 52 stores the absolute position AP1 or the additional absolute position AP2 as the reference position RP and/or resets the second information F3 if the second member 16 reaches the absolute position AP1 or the additional absolute position AP2. Accordingly, it is possible to improve the accuracy of the current position CP.

Second Embodiment

A rider-posture changing device 212 in accordance with a second embodiment will be described below referring to FIGS. 12 to 16. The rider-posture changing device 212 has the same structure and/or configuration as those of the rider-posture changing device 12 except for the first detector, the first additional detector, and the second detector. Thus, elements having substantially the same function as those in the first embodiment will be numbered the same here, and will not be described and/or illustrated again in detail here for the sake of brevity.

Figure 12:
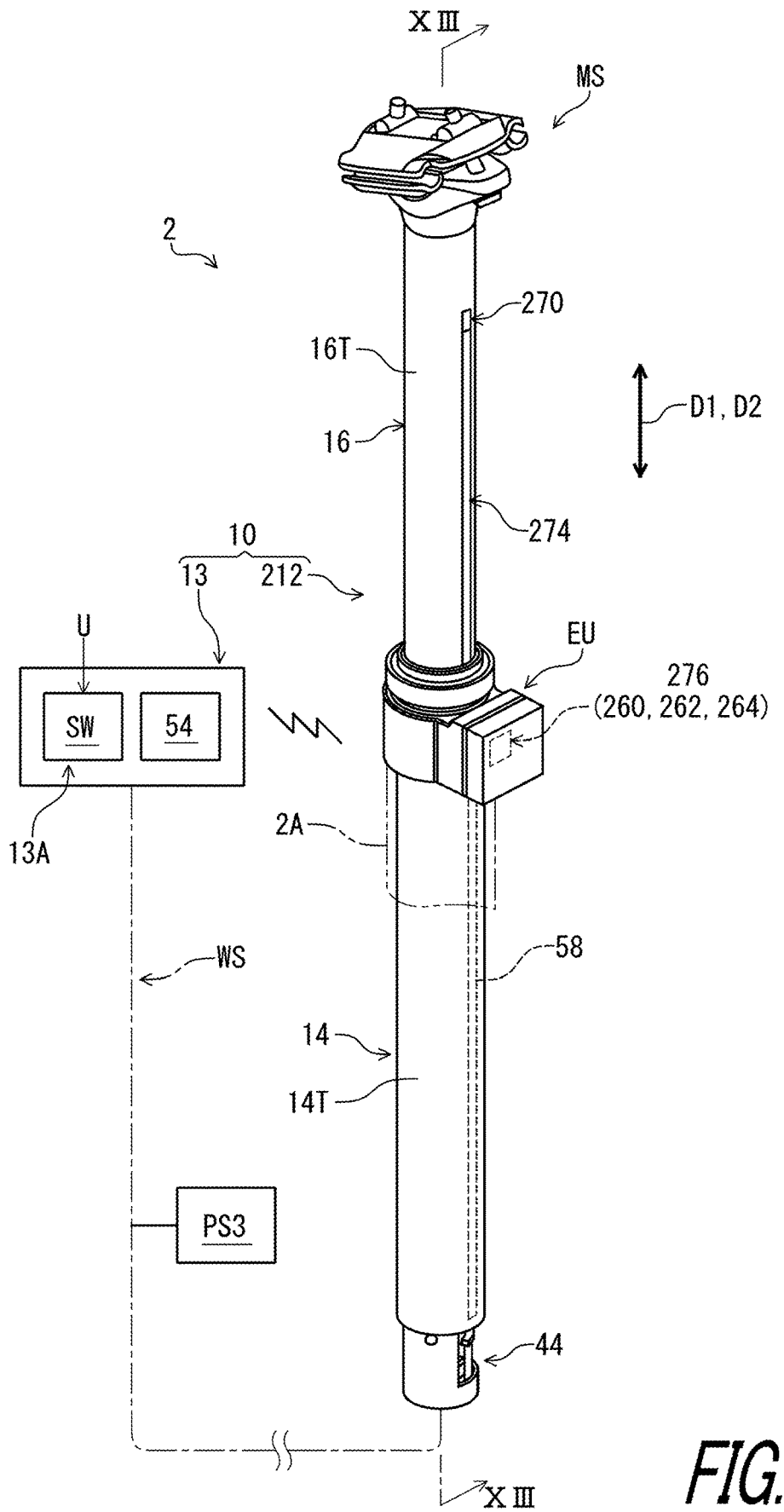
FIG. 12 is a perspective view of a rider-posture changing device of a control system of a human-powered vehicle in accordance with a second embodiment, with a schematic block diagram of an operating device of the control system.
Figure 13:
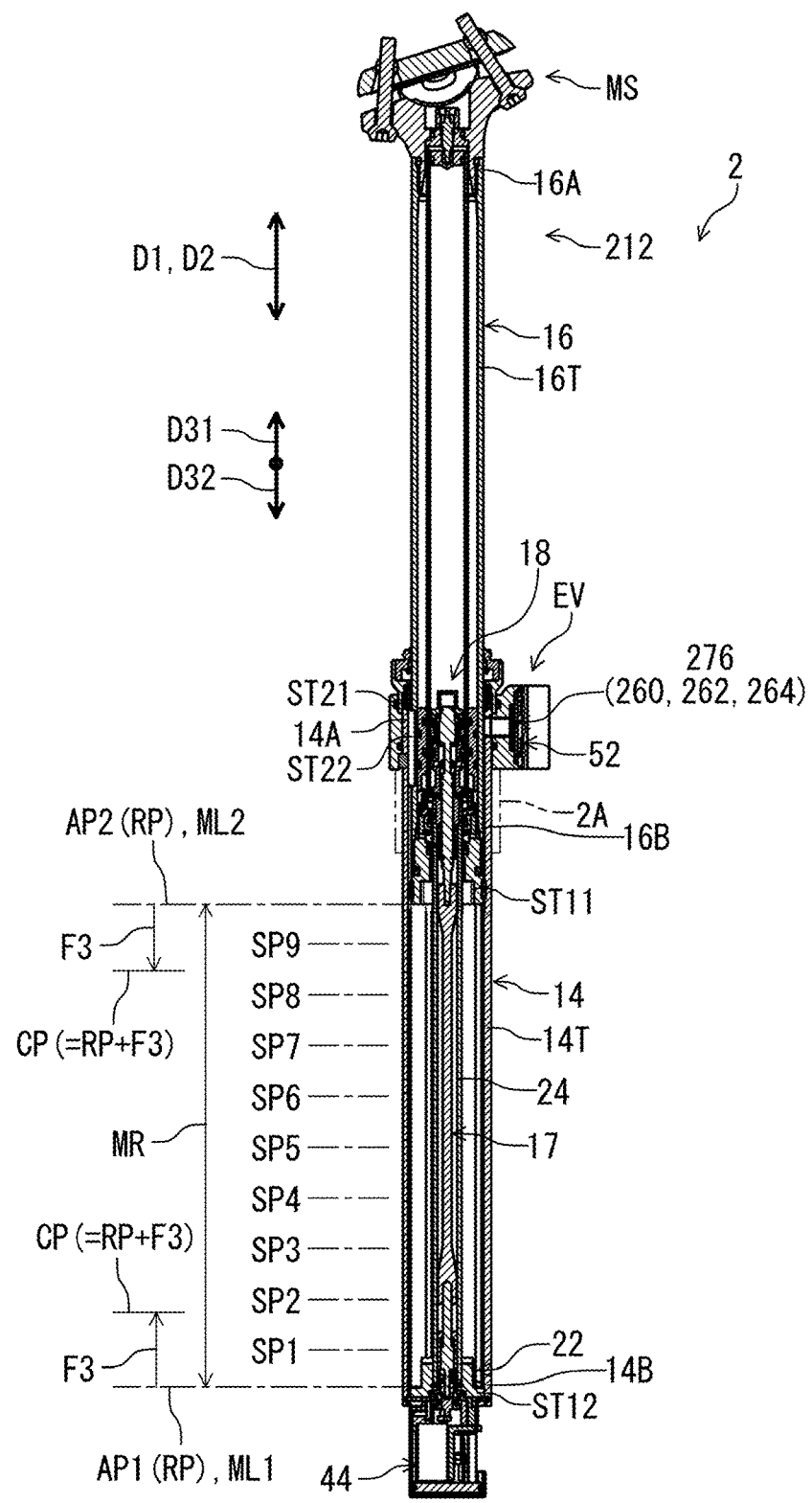
FIG. 13 is a cross-sectional view of the rider-posture changing device taken along line XIII-XIII of FIG. 12.

As seen in FIGS. 12 and 13, the rider-posture changing device 212 for the human-powered vehicle 2 comprises a first detector 260. The first detector 260 is configured to detect the first information F1 indicating whether the second member 16 reaches the absolute position AP1 or not.

The rider-posture changing device 212 further comprises a first additional detector 262. The first additional detector 262 is configured to detect the first additional information F2 indicating whether the second member 16 reaches the additional absolute position AP2 or not. The additional absolute position AP2 is spaced apart from the absolute position AP1 in the longitudinal direction D1.

The rider-posture changing device 212 for the human-powered vehicle 2 comprises a second detector 264. The second detector 264 is configured to detect the second information F3 indicating the movement distance of the second member 16 from the reference position RP in the longitudinal direction D1.

The second detector 264 is configured to detect the moving direction of the second member 16 relative to the first member 14 in addition to the movement distance of the second member 16. The second detector 264 is configured to detect the first moving direction D31 of the second member 16 when the second member 16 is moved relative to the first member 14 toward the additional absolute position AP2. The second detector 264 is configured to detect the second moving direction D32 of the second member 16 when the second member 16 is moved relative to the first member 14 toward the absolute position AP1. The second detector 264 is configured to detect a movement distance as a positive value when the second detector 264 detects the first moving direction D31. The second detector 264 is configured to detect a movement distance as a negative value when the second detector 264 detects the second moving direction D32.

As seen in FIG. 12, the rider-posture changing device 212 further comprises a first detection object 270. The first detection object 270 is provided to at least one of the first member 14 and the second member 16. The first detector 260 is configured to detect the first detection object 270 to obtain the first information F1. The first detector 260 includes a non-contact detector configured to detect the first detection object 270 to obtain the first information F1 without contacting the first detection object 270. In the present embodiment, the first detector 260 is provided to the first member 14. The first detection object 270 is provided to the second member 16. The first detection object 270 is provided on the outer peripheral surface of the second member 16. However, the first detector 260 and the first detection object 270 can be provided to other portions of the rider-posture changing device 212. The first detector 260 can include other detectors such as a contact detector.

Figure 14:
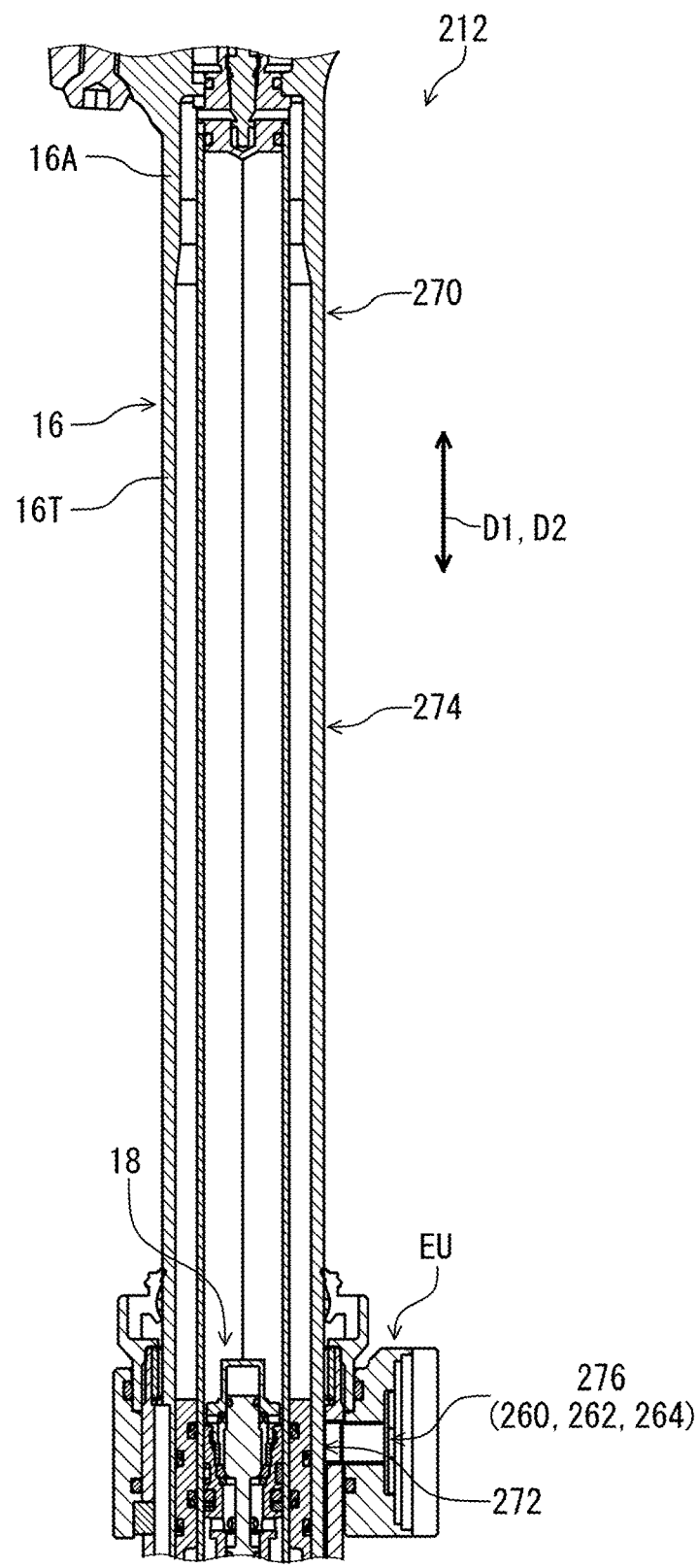
FIG. 14 is a partial cross-sectional view of the rider-posture changing device illustrated in FIG. 13.

As seen in FIG. 14, the rider-posture changing device 212 further comprises a first additional detection object 272. The first additional detection object 272 is provided to at least one of the first member 14 and the second member 16. The first additional detector 262 is configured to detect the first additional detection object 272 to obtain the first additional information F2. The first additional detector 262 includes a non-contact detector configured to detect the first additional detection object 272 to obtain the first additional information F2 without contacting the first additional detection object 272. In the present embodiment, the first additional detector 262 is provided to the first member 14. The first additional detection object 272 is provided to the second member 16. The first additional detection object 272 is provided on the outer peripheral surface of the second member 16. However, the first additional detector 262 and the first additional detection object 272 can be provided to other portions of the rider-posture changing device 212. The first additional detector 262 can include other detectors such as a contact detector.

As seen in FIG. 12, the rider-posture changing device 212 further comprises a second detection object 274. The second detection object 274 is provided to at least one of the first member 14 and the second member 16. The second detector 264 is configured to detect the second detection object 274 to obtain the second information F3. The second detector 264 includes a non-contact detector configured to detect the second detection object 274 to obtain the second information F3 without contacting the second detection object 274. In the present embodiment, the second detector 264 is provided to the first member 14. The second detection object 274 is provided to the second member 16. The second detection object 274 is provided on the outer peripheral surface of the second member 16. However, the second detector 264 and the second detection object 274 can be provided to other portions of the rider-posture changing device 212. The second detector 264 can include other detectors such as a contact detector.

Figure 15:
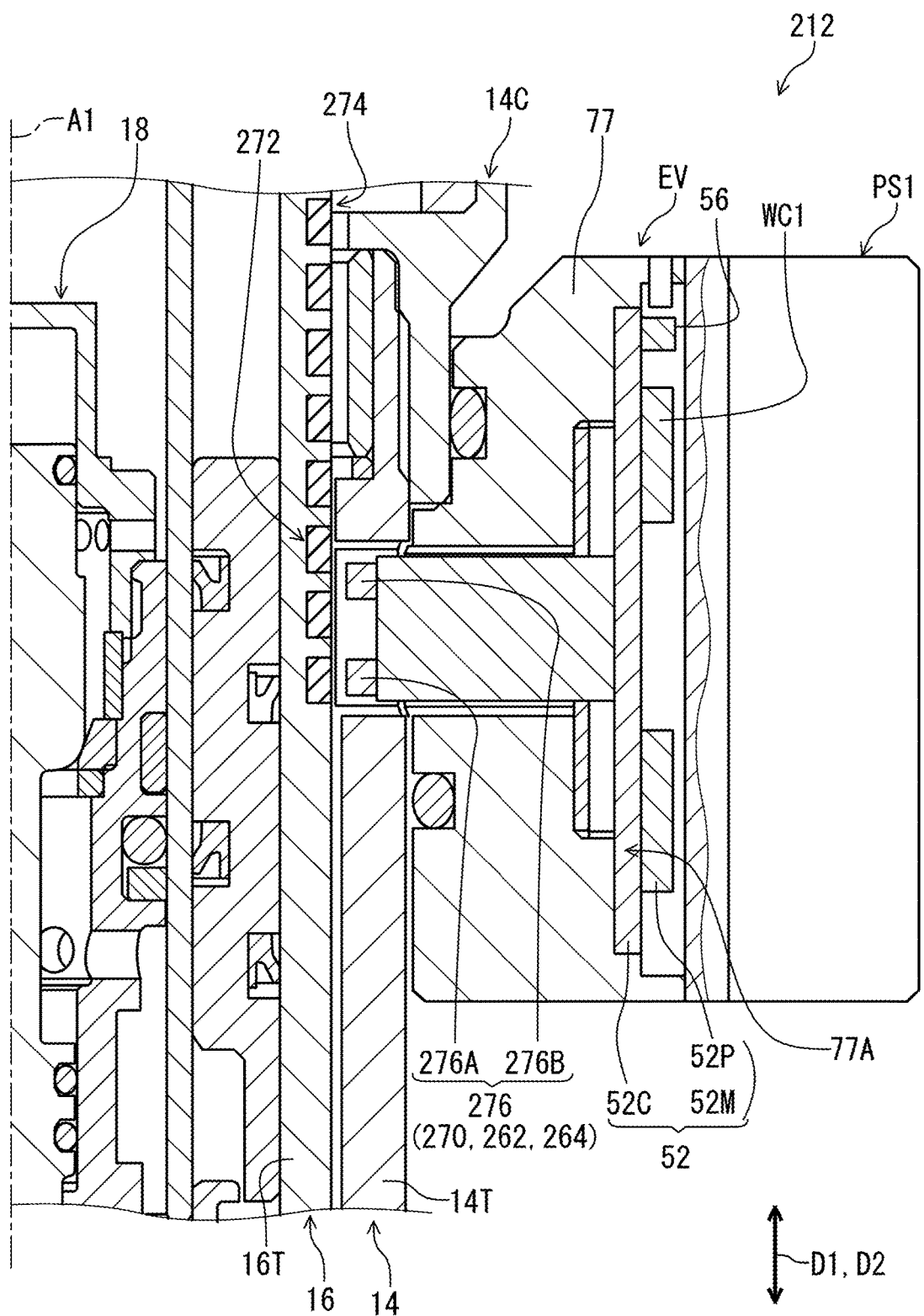
FIG. 15 is a partial cross-sectional view of the rider-posture changing device illustrated in FIG. 13.

As seen in FIG. 15, in the present embodiment, the first detector 260 and the second detector 264 are integrally provided with each other as a single unit. The first detector 260, the first additional detector 262, and the second detector 264 are integrally provided with each other as a single unit. However, at least one of the first detector 260, the first additional detector 262, and the second detector 264 can be a separate unit from another.

The first detector 260, the first additional detector 262, and the second detector 264 constitute an magnetic sensor 276. The magnetic sensor 276 is configured to detect a movement distance and a moving direction of the second member 16 relative to the first member 14. The magnetic sensor 276 is configured to measure the magnitude of a magnetic field. Examples of the magnetic sensor 276 include a hall-effect sensor.

For example, the magnetic sensor 276 includes a first magnetic sensor 276A and a second magnetic sensor 276B. The first magnetic sensor 276A is configured to measure the magnitude of a magnetic field. The second magnetic sensor 276B is configured to measure the magnitude of a magnetic field. Examples of the first magnetic sensor 276A and the second magnetic sensor 276B include a hall-effect sensor. However, the magnetic sensor 276 can be a single magnetic sensor or can include three or more magnetic sensors.

Figure 16:
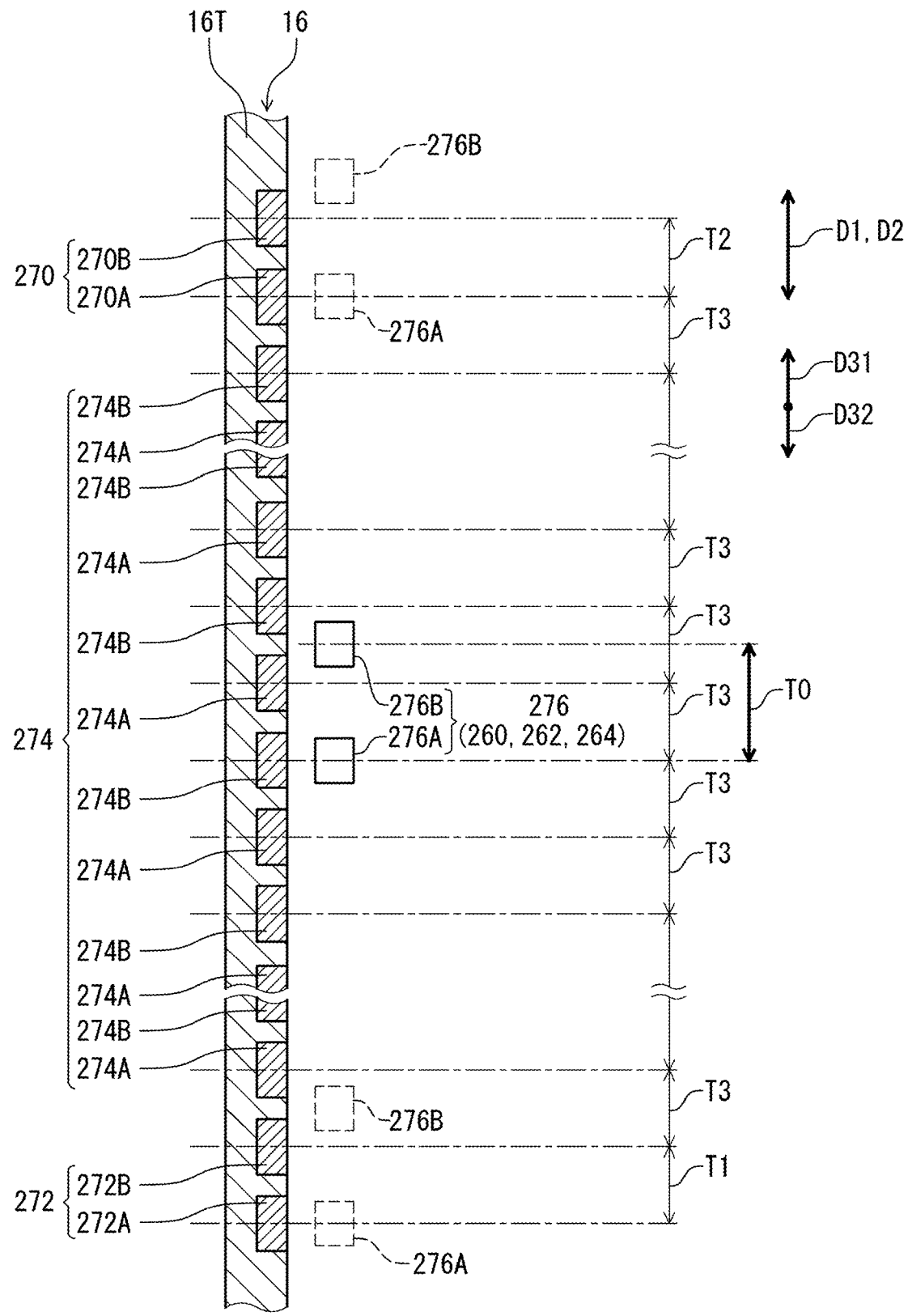
FIG. 16 is a schematic diagram indicating arrangement of detectors and detection objects of the rider-posture changing device illustrated in FIG. 12.

As seen in FIG. 16, the first detection object 270 is configured to generate a magnetic field. For example, the first detection object 270 is formed by multi-pole magnetization. The first detection object 270 includes a plurality of first magnetic parts 270A and 270B. The first magnetic part 270A has a magnetic pole identical to a magnetic pole of the first magnetic part 270B. For example, the first magnetic part 270A has a north pole, and the first magnetic part 270B has a north pole. In the present embodiment, a pitch PT0 between the first magnetic sensor 276A and the second magnetic sensor 276B is different from a pitch PT1 between the first magnetic parts 270A and 270B.

The first additional detection object 272 is configured to generate a magnetic field. For example, the first additional detection object 272 is formed by multi-pole magnetization. The first additional detection object 272 includes a plurality of first additional magnetic parts 272A and 272B. The first additional magnetic part 272A has a magnetic pole identical to a magnetic pole of the first additional magnetic part 272B. For example, the first additional magnetic part 272A has a south pole, and the first additional magnetic part 272B has a south pole. In the present embodiment, the pitch PT0 between the first magnetic sensor 276A and the second magnetic sensor 276B is different from a pitch PT2 between the first additional magnetic parts 272A and 272B.

The second detection object 274 is configured to generate a magnetic field. For example, the second detection object 274 is formed by multi-pole magnetization. The second detection object 274 includes a plurality of second magnetic parts 274A and a plurality of second magnetic parts 274B. The plurality of second magnetic parts 274A and the plurality of second magnetic parts 274B are alternatingly arranged in the longitudinal direction D1. The plurality of second magnetic parts 274A and the plurality of second magnetic parts 274B are provided between the first detection object 270 and the first additional detection object 272 in the longitudinal direction D1.

The second magnetic part 274A has a magnetic pole different from a magnetic pole of the second magnetic part 274B. For example, the second magnetic part 274A has a north pole, and the second magnetic part 274B has a south pole. In the present embodiment, the pitch PT0 between the first magnetic sensor 276A and the second magnetic sensor 276B is different from as a pitch PT3 between the second magnetic parts 274A and 274B. The pitch PT1 between the first magnetic parts 270A and 270B is identical to the pitch PT3 between the second magnetic parts 274A and 274B. The pitch PT2 between the first additional magnetic parts 272A and 272B is identical to the pitch PT3 between the second magnetic parts 274A and 274B.

For example, each of the first magnetic sensor 276A and the second magnetic sensor 276B is configured to output a voltage depending on a magnetic pole and a magnitude of the magnetic field. For example, each of the first magnetic sensor 276A and the second magnetic sensor 276B is configured to linearly output a larger voltage in response to a greater magnitude of the magnetic field generated by a north pole. Each of the first magnetic sensor 276A and the second magnetic sensor 276B is configured to linearly output a lower voltage in response to a smaller magnitude of the magnetic field generated by a south pole.

The output of one of the first magnetic sensor 276A and the second magnetic sensor 276B can indicate the movement distance of the second member 16 relative to the first magnetic sensor 276A. The relationship between the output of the first magnetic sensor 276A and the output of the second magnetic sensor 276B is different with respect to each of the first detection object 270, the first additional detection object 272, and the second detection object 274. Furthermore, the relationship between the output of the first magnetic sensor 276A and the output of the second magnetic sensor 276B is different with respect to the first moving direction D31 and the second moving direction D32 of the second member 16. Thus, the controller 52 is configured to recognize the first information F1, the first additional information F2, and the second information F3 based on the output of the magnetic sensor 276 (e.g., the output of the first magnetic sensor 276A and the output of the second magnetic sensor 276B).

As seen in FIG. 15, the rider-posture changing device 212 further comprises the electrical unit EU. The electrical unit EU includes at least one of the first detector 260, the second detector 264, the controller 52, the wireless communicator WC1, and the informing device 56. The electrical unit EU includes at least one of the first detector 260, the first additional detector 262, the second detector 264, the controller 52, the wireless communicator WC1, and the informing device 56. The at least one of the first detector 260, the second detector 264, the controller 52, the wireless communicator WC1, and the informing device 56 provides a single unit configured to be detachably attached to the first member 14 as the single unit. The at least one of the first detector 260, the first additional detector 262, the second detector 264, the controller 52, the wireless communicator WC1, and the informing device 56 provides the single unit configured to be detachably attached to the first member 14 as the single unit.

In the present embodiment, the electrical unit EU includes the first detector 260, the first additional detector 262, the second detector 264, the controller 52, the wireless communicator WC1, and the informing device 56. The first detector 260, the first additional detector 262, the second detector 264, the controller 52, the wireless communicator WC1, and the informing device 56 provide the single unit configured to be detachably attached to the first member 14 as the single unit. The circuit board 52C of the controller 52 is detachably attached to the first member 14. The first detector 260, the first additional detector 262, the second detector 264, the wireless communicator WC1, and the informing device 56 are electrically mounted on the circuit board 52C. However, at least one of the first detector 260, the first additional detector 262, the second detector 264, the controller 52, the wireless communicator WC1, and the informing device 56 can be omitted from the single unit.

The control executed by the controller 52 in the second embodiment is the same as the control of the controller 52 in the first embodiment. Thus, it will be omitted here for the sake of brevity.

Third Embodiment

A rider-posture changing device 312 in accordance with a second embodiment will be described below referring to FIGS. 17 to 22. The rider-posture changing device 312 has the same structure and/or configuration as those of the rider-posture changing device 12 except for the first detector, the first additional detector, and the second detector. Thus, elements having substantially the same function as those in the first embodiment will be numbered the same here, and will not be described and/or illustrated again in detail here for the sake of brevity.

Figure 17:
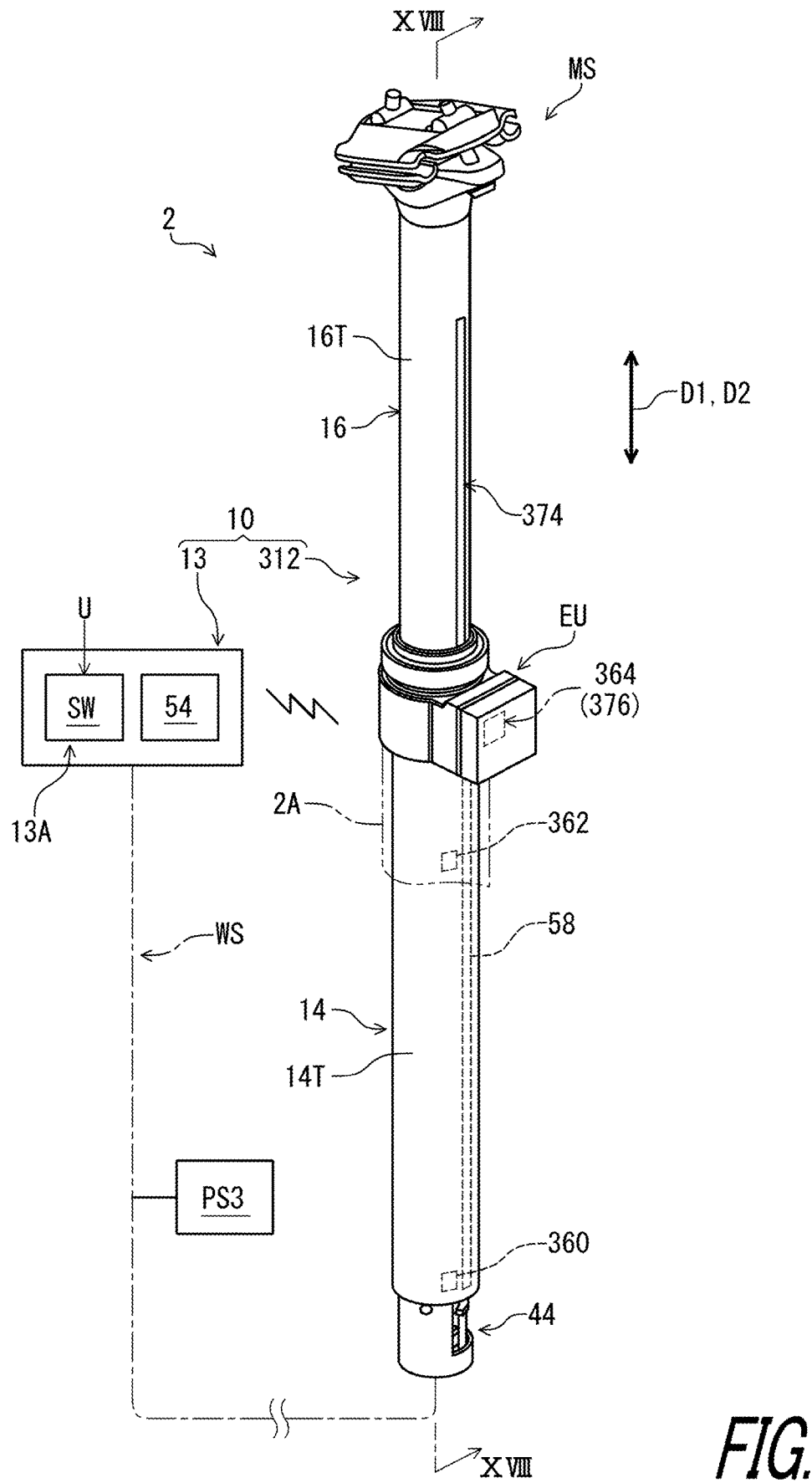
FIG. 17 is a perspective view of a rider-posture changing device of a control system of a human-powered vehicle in accordance with a third embodiment, with a schematic block diagram of an operating device of the control system.
Figure 18:
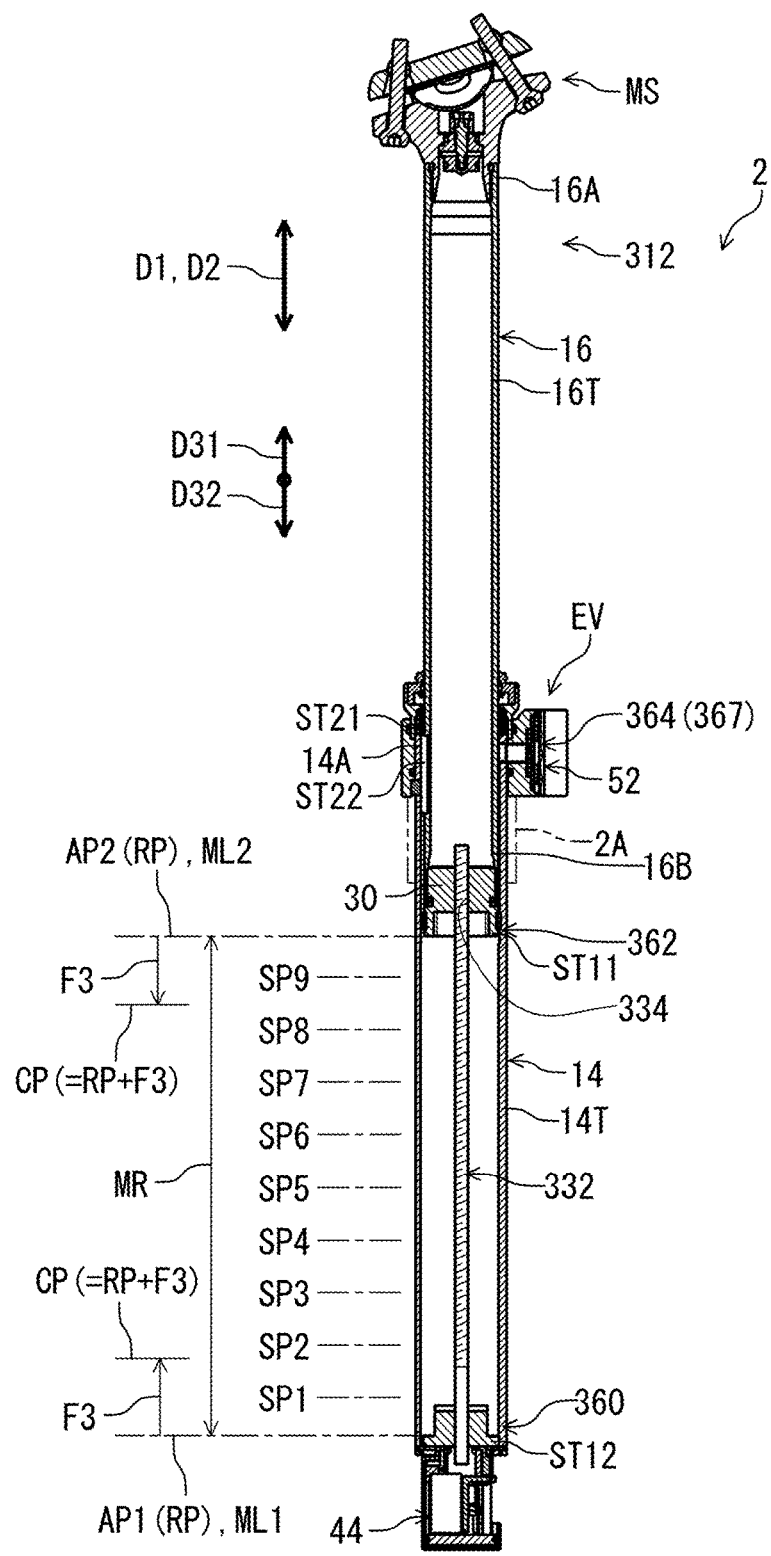
FIG. 18 is a cross-sectional view of the rider-posture changing device taken along line XVIII-XVIII of FIG. 17.

As seen in FIGS. 17 and 18, the rider-posture changing device 312 for the human-powered vehicle 2 comprises the first member 14 and the second member 16. However, the hydraulic structure 18 is omitted from the rider-posture changing device 312. As seen in FIG. 18, the rider-posture changing device 312 includes a screw rod 332 having an external thread. The intermediate support 30 includes a threaded hole 334. The screw rod 332 is operatively coupled to the actuator 44.

The actuator 44 is configured to rotate the screw rod 332 to move the second member 16 relative to the first member 14 in the longitudinal direction D1. Specifically, the actuator 44 is configured to rotate the screw rod 332 to move the second member 16 relative to the first member 14 in the first moving direction D31 or the second moving direction D32.

As seen in FIGS. 17 and 18, the rider-posture changing device 312 for the human-powered vehicle 2 comprises a first detector 360. The first detector 360 is configured to detect the first information F1 indicating whether the second member 16 reaches the absolute position AP1 or not.

The rider-posture changing device 312 further comprises a first additional detector 362. The first additional detector 362 is configured to detect the first additional information F2 indicating whether the second member 16 reaches the additional absolute position AP2 or not. The additional absolute position AP2 is spaced apart from the absolute position AP1 in the longitudinal direction D1.

The rider-posture changing device 312 for the human-powered vehicle 2 comprises a second detector 364. The second detector 364 is configured to detect the second information F3 indicating the movement distance of the second member 16 from the reference position RP in the longitudinal direction D1.

The second detector 364 is configured to detect the moving direction of the second member 16 relative to the first member 14 in addition to the movement distance of the second member 16. The second detector 364 is configured to detect the first moving direction D31 of the second member 16 when the second member 16 is moved relative to the first member 14 toward the additional absolute position AP2. The second detector 364 is configured to detect the second moving direction D32 of the second member 16 when the second member 16 is moved relative to the first member 14 toward the absolute position AP1. The second detector 364 is configured to detect a movement distance as a positive value when the second detector 364 detects the first moving direction D31. The second detector 364 is configured to detect a movement distance as a negative value when the second detector 364 detects the second moving direction D32.

Figure 19:
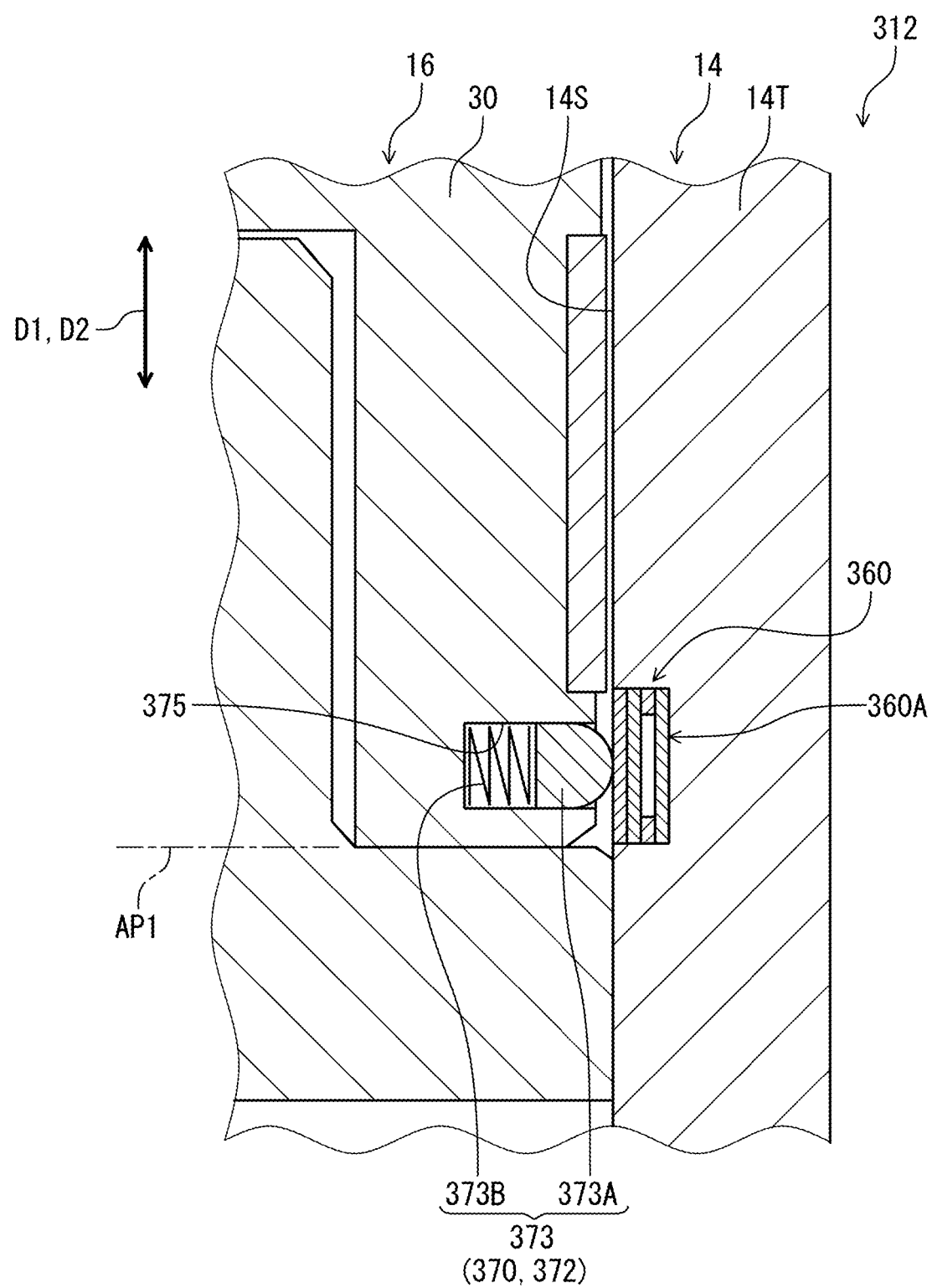
FIG. 19 is a partial cross-sectional view of the rider-posture changing device illustrated in FIG. 18.

As seen in FIG. 19, the rider-posture changing device 312 further comprises a first detection object 370. The first detection object 370 is provided to at least one of the first member 14 and the second member 16. The first detector 360 is configured to detect the first detection object 370 to obtain the first information F1. The first detector 360 includes a contact detector configured to detect the first detection object 370 to obtain the first information F1 by contacting the first detection object 370. In the present embodiment, the first detector 360 is provided to the first member 14. The first detection object 370 is provided to the second member 16. The first detection object 370 is provided on the outer peripheral surface of the second member 16. However, the first detector 360 and the first detection object 370 can be provided to other portions of the rider-posture changing device 312. The first detector 360 can include other detectors such as a non-contact detector.

Figure 20:
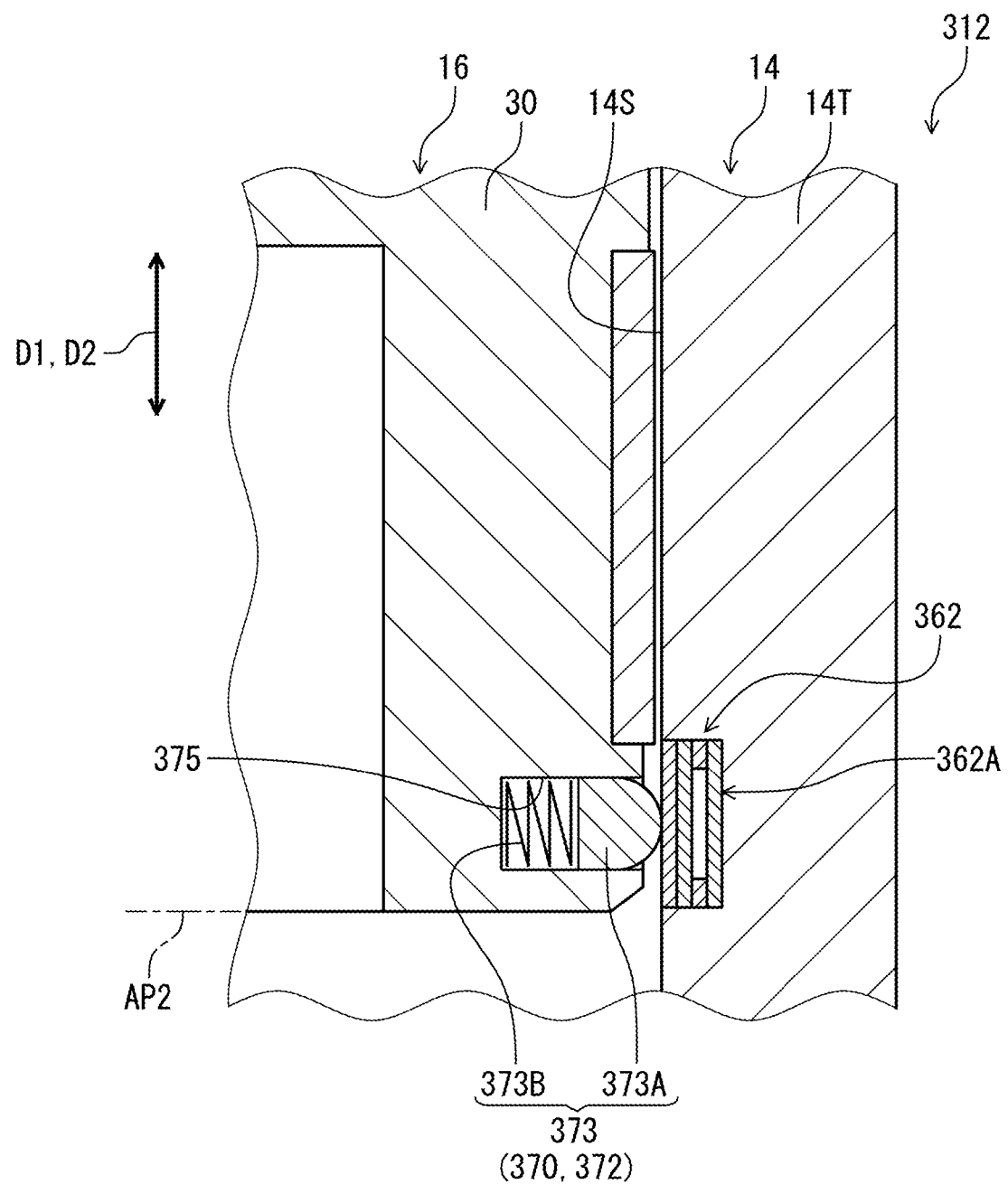
FIG. 20 is a partial cross-sectional view of the rider-posture changing device illustrated in FIG. 18.

As seen in FIG. 20, the rider-posture changing device 312 further comprises a first additional detection object 372. The first additional detection object 372 is provided to at least one of the first member 14 and the second member 16. The first additional detector 362 is configured to detect the first additional detection object 372 to obtain the first additional information F2. The first additional detector 362 includes a contact detector configured to detect the first additional detection object 372 to obtain the first information F1 by contacting the first additional detection object 372. In the present embodiment, the first additional detector 362 is provided to the first member 14. The first additional detection object 372 is provided to the second member 16. The first additional detection object 372 is provided on the outer peripheral surface of the second member 16. However, the first additional detector 362 and the first additional detection object 372 can be provided to other portions of the rider-posture changing device 312. The first additional detector 362 can include other detectors such as a non-contact detector.

As seen in FIGS. 19 and 20, in the present embodiment, the first detection object 370 and the first additional detection object 372 constitute a detection object 373. The detection object 373 includes a movable part 373A and a biasing member 373B. The movable part 373A is movably attached to the second member 16. The second member 16 includes a recess 375. The movable part 373A is movably provided in the recess 375 of the second member 16. The biasing member 373B is provided in the recess 375 to bias the movable part 373A toward the first member 14. The movable part 373A is configured to be in contact with an inner peripheral surface 14S of the first member 14. The movable part 373A is configured to slide with the inner peripheral surface 14S of the first member 14 while the second member 16 is moved relative to the first member 14 in the longitudinal direction D1.

The first detector 360 includes a resistive sensor 360A configured to detect that the first detection object 370 is in contact with the first detector 360. The resistive sensor 360A is provided in the inner peripheral surface 14S of the first member 14. The resistive sensor 360A includes a pair of electrode films and a plurality of electric insulators. The pair of electrode films is spaced apart from each other. The plurality of electric insulators is provided between the pair of electrode films. One of the electrode films comes into contact with the other of the electrode films when the one of the electrode films is pressed by the movable part 373A of the detection object 373. Thus, the first detector 360 is configured to detect that the movable part 373A of the detection object 373 is in contact with the resistive sensor 360A. Namely, the first detector 360 is configured to detect the first information F1 indicating the second member 16 reaches the absolute position AP1 when the first detection object 370 reaches a detection area of the first detector 360.

As seen in FIG. 20, the first additional detector 362 includes a resistive sensor 362A configured to detect that the first additional detection object 372 is in contact with the first additional detector 362. The resistive sensor 362A is provided in the inner peripheral surface 14S of the first member 14. The resistive sensor 362A is configured to detect that the movable part 373A of the detection object 373 is in contact with the resistive sensor 362A. Namely, the first additional detector 362 is configured to detect the first information F1 indicating the second member 16 reaches the absolute position AP1 when the first additional detection object 372 reaches a detection area of the first additional detector 362. The first additional detector 362 has substantially the same structure as that of the first detector 360. Thus, they will not be described and/or illustrated in detail here for the sake of brevity.

As seen in FIG. 17, the rider-posture changing device 312 further comprises a second detection object 374. The second detection object 374 is provided to at least one of the first member 14 and the second member 16. The second detector 364 is configured to detect the second detection object 374 to obtain the second information F3. The second detector 364 includes a non-contact detector configured to detect the second detection object 374 to obtain the second information F3 without contacting the second detection object 374. In the present embodiment, the second detector 364 is provided to the first member 14. The second detection object 374 is provided to the second member 16. The second detection object 374 is provided on the outer peripheral surface of the second member 16. However, the second detector 364 and the second detection object 374 can be provided to other portions of the rider-posture changing device 312. The second detector 364 can include other detectors such as a contact detector.

In the present embodiment, the first detector 360, the first additional detector 362, and the second detector 364 are separate units from each other. However, at least two of the first detector 360, the first additional detector 362, and the second detector 364 can be integrally provided with each other as a single unit.

Figure 21:
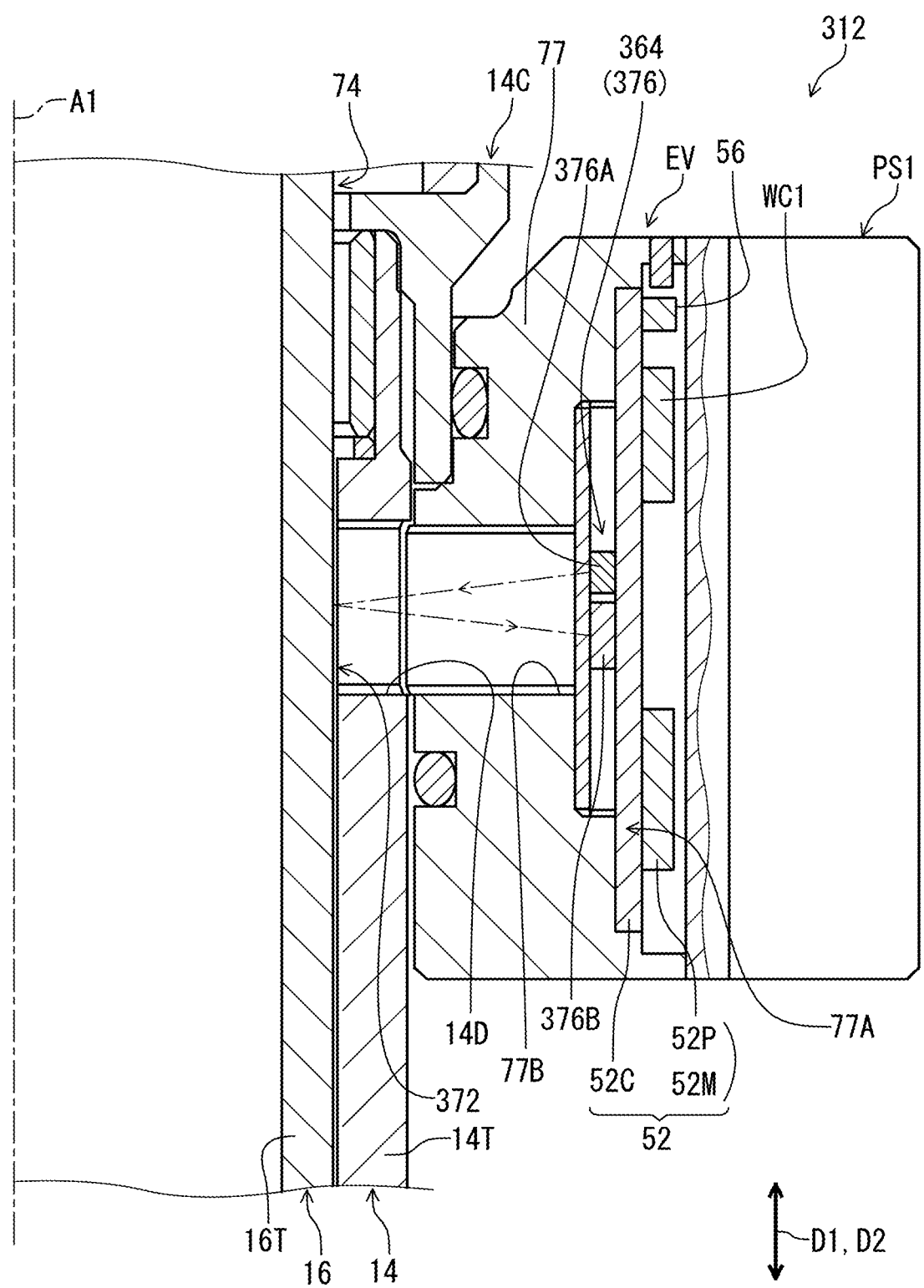
FIG. 21 is a partial cross-sectional view of the rider-posture changing device illustrated in FIG. 18.

As seen in FIG. 21, the second detector 364 includes an optical sensor 376. The optical sensor 376 is configured to detect a movement distance of the second member 16 relative to the first member 14. Examples of the optical sensor 376 include an optical encoder. The optical sensor 376 includes a light emitter 376A and a light receiver 376B. The light emitter 376A is configured to emit light to the second member 16. For example, the light emitter 76A includes a light emitting diode configured to emit light. The light receiver 376B is configured to receive light reflected by the second detection object 374. For example, the light receiver 376B includes a photo detector and an amplifier. The photo detector is configured to convert light to electricity. The amplifier is configured to amplify the output of the photo detector. Examples of the photo detector include a photodiode. The controller 52 is configured to periodically receive the output of the light receiver 376B and is configured to obtain the movement distance of the second member 16 based on the output of the light receiver 376B.

The second detection object 374 includes a pattern such that the light receiver 376B detects the movement distance and the moving direction of the second member 16. The second detection object 374 includes a plurality of reflective parts and a plurality of non-reflective parts constituting the pattern. The plurality of reflective parts and the plurality of non-reflective parts are alternatingly arranged in the longitudinal direction D1. The plurality of reflective parts is arranged in the longitudinal direction D1 at constant pitches. The optical sensor 376 is configured to detect light reflected on the reflective part to obtain the movement distance of the second member 16.

As seen in FIG. 21, the rider-posture changing device 312 further comprises the electrical unit EU. The electrical unit EU includes at least one of the first detector 360, the second detector 364, the controller 52, the wireless communicator WC1, and the informing device 56. The electrical unit EU includes at least one of the first detector 360, the first additional detector 362, the second detector 364, the controller 52, the wireless communicator WC1, and the informing device 56. The at least one of the first detector 360, the second detector 364, the controller 52, the wireless communicator WC1, and the informing device 56 provides a single unit configured to be detachably attached to the first member 14 as the single unit. The at least one of the first detector 360, the first additional detector 362, the second detector 364, the controller 52, the wireless communicator WC1, and the informing device 56 provides the single unit configured to be detachably attached to the first member 14 as the single unit.

In the present embodiment, the electrical unit EU includes the second detector 364, the controller 52, the wireless communicator WC1, and the informing device 56. The second detector 364, the controller 52, the wireless communicator WC1, and the informing device 56 provide the single unit configured to be detachably attached to the first member 14 as the single unit. The circuit board 52C of the controller 52 is detachably attached to the first member 14. The first detector 360, the first additional detector 362, the second detector 364, the wireless communicator WC1, and the informing device 56 are electrically mounted on the circuit board 52C. However, at least one of the second detector 364, the controller 52, the wireless communicator WC1, and the informing device 56 can be omitted from the single unit.

Figure 22:
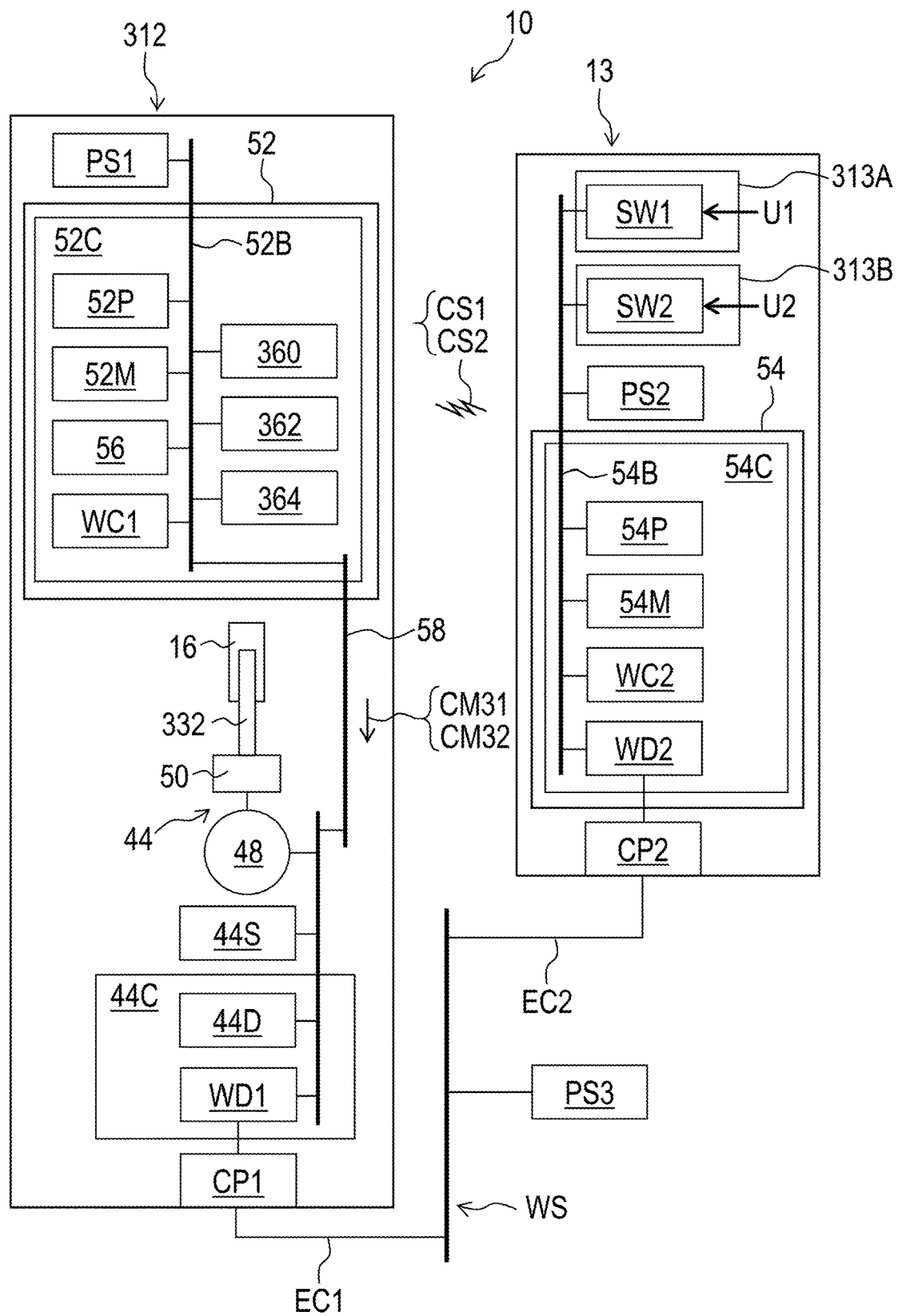
FIG. 22 is a schematic block diagram of the rider-posture changing device illustrated in FIG. 17.

As seen in FIG. 22, the operating device 13 includes a first user interface 313A and a second user interface 313B. The first user interface 313A is configured to receive a first user input U1. The first user interface 313A includes a first electrical switch SW1 configured to be activated in response to the first user input U1. The second user interface 313B is configured to receive a second user input U2. The second user interface 313B includes a second electrical switch SW2 configured to be activated in response to the second user input U2. For example, each of the first user interface 313A and the second user interface 313B includes a push-button switch. However, each of the first user interface 313A and the second user interface 313B can include other user interfaces.

The signal controller 54 is configured to generate a first control signal CS1 in response to the first user input U1. The signal controller 54 is configured to generate the first control signal CS1 when the first electrical switch SW1 is pressed. The signal controller 54 is configured to generate a second control signal CS2 in response to the second user input U2. The signal controller 54 is configured to generate the second control signal CS2 when the second electrical switch SW2 is pressed.

Figure 23:
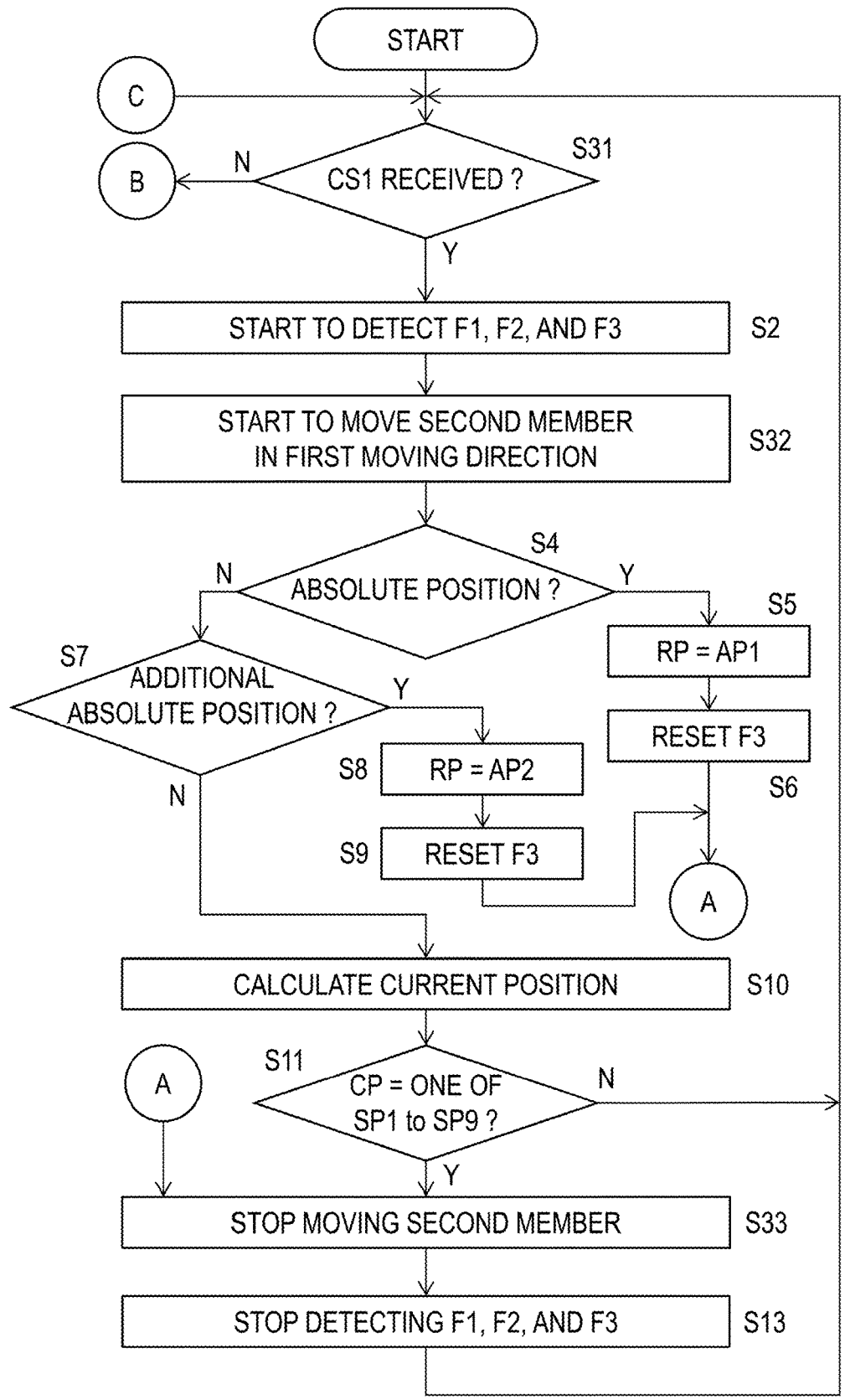
FIGS. 23 and 24 is flow charts of the rider-posture changing device illustrated in FIG. 17.
Figure 24:
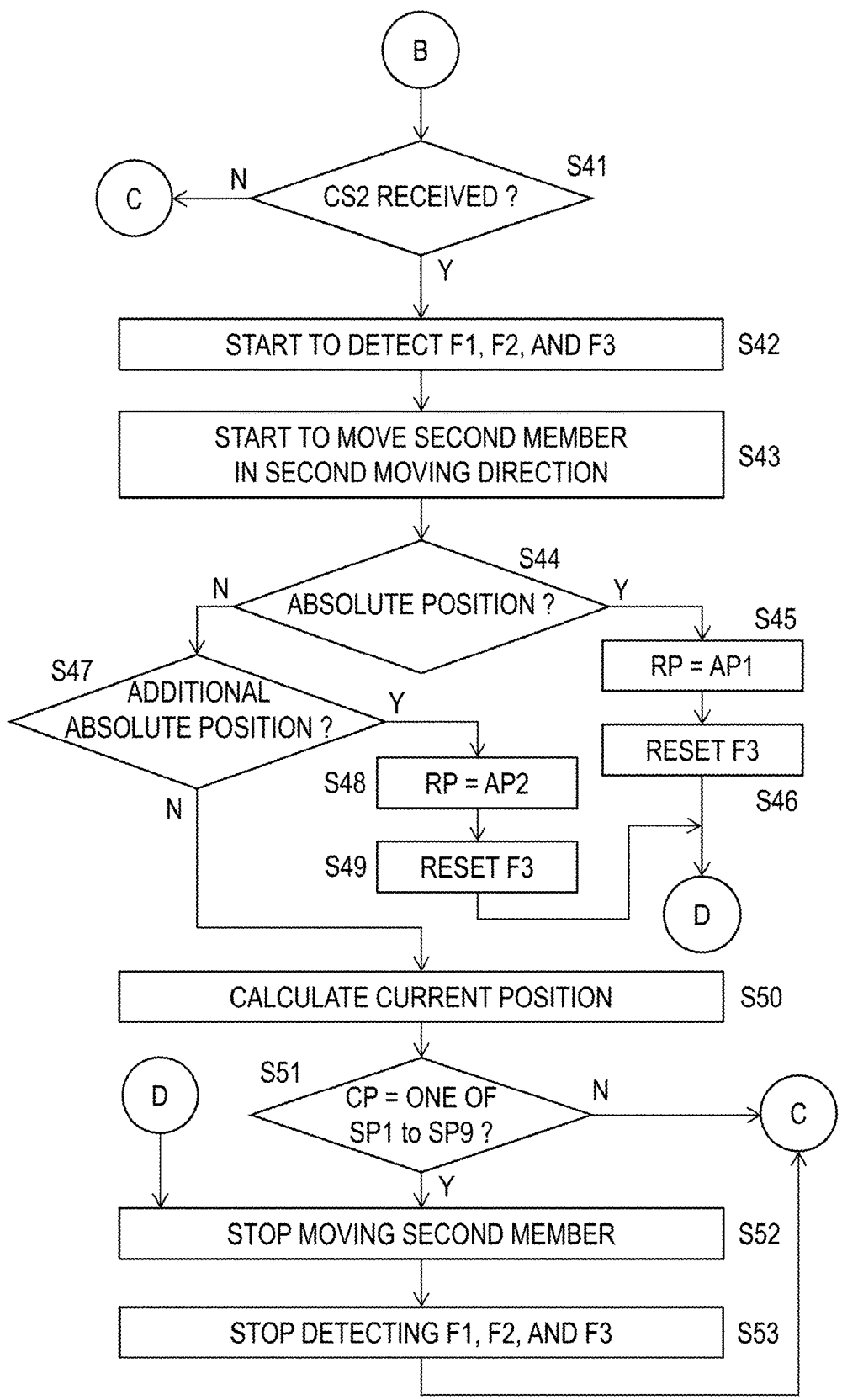

The control executed by the controller 52 will be described below referring to FIGS. 23 and 24. As seen in FIGS. 23 and 24, the controller 52 determines whether the first control signal CS1 or the second control signal CS2 is received or not (step S31 or S41). The controller 52 keeps monitoring the first control signal CS1 or the second control signal CS2 if the controller 52 concludes that the first control signal CS1 or the second control signal CS2 is not received (step S31 or S41).

As seen in FIG. 23, the controller 52 controls the first detector 60, the first additional detector 62, and the second detector 64 to start to detect the first information F1, the first additional information F2, and the second information F3 if the controller 52 concludes that the first control signal CS1 is received (steps S31 and S2). The controller 52 controls the actuator 44 to move the second member 16 relative to the first member 14 in the first moving direction D31 (step S32).

The controller 52 determines whether the first detector 60 detects the first information F1 indicating the second member 16 reaches the absolute position AP1 or not (step S4). The controller 52 stores the absolute position AP1 as the reference position RP if the first information F1 indicates that the second member 16 reaches the absolute position AP1 (steps S4 and S5). The controller 52 resets the second information F3 if the first information F1 indicates that the second member 16 reaches the absolute position AP1 (steps S4 and S6). The process enters step S33.

The controller 52 determines whether the first additional detector 62 detects the first additional information F2 indicating the second member 16 reaches the additional absolute position AP2 or not if the first information F1 does not indicate that the second member 16 reaches the absolute position AP1 (steps S4 and S7). The controller 52 stores the additional absolute position AP2 as the reference position RP if the first additional information F2 indicates that the second member 16 reaches the additional absolute position AP2 (steps S7 and S8). The controller 52 resets the second information F3 if the first additional information F2 indicates that the second member 16 reaches the additional absolute position AP2 (steps S7 and S9). The process enters step S33.

The controller 52 calculates the current position CP based on the reference position RP and the second information F3 (step S10). Specifically, the controller 52 adds the second information F3 to the reference position RP to obtain the current position CP. The controller 52 compares the current position CP with each of the stop positions SP1 to SP9. The controller 52 controls the actuator 44 to stop moving the second member 16 if the current position CP is coincident with one of the stop positions SP1 to SP9 (steps S11 and S33). Thus, the second member 16 is stopped in one of the absolute position AP1, the additional absolute position AP2, and the stop positions SP1 to SP9. The controller 52 controls the first detector 60, the first additional detector 62, and the second detector 64 to stop detecting the first information F1, the first additional information F2, and the second information F3 (step S13). The process returns to the step S31.

As seen in FIG. 24, the controller 52 controls the first detector 60, the first additional detector 62, and the second detector 64 to start to detect the first information F1, the first additional information F2, and the second information F3 if the controller 52 concludes that the second control signal CS2 is received (steps S31 and S32). The controller 52 controls the actuator 44 to move the second member 16 relative to the first member 14 in the second moving direction D32 (step S43).

The controller 52 determines whether the first detector 60 detects the first information F1 indicating the second member 16 reaches the absolute position AP1 or not (step S44). The controller 52 stores the absolute position AP1 as the reference position RP if the first information F1 indicates that the second member 16 reaches the absolute position AP1 (steps S44 and S45). The controller 52 resets the second information F3 if the first information F1 indicates that the second member 16 reaches the absolute position AP1 (steps S44 and S46). The process enters step S52.

The controller 52 determines whether the first additional detector 62 detects the first additional information F2 indicating the second member 16 reaches the additional absolute position AP2 or not if the first information F1 does not indicate that the second member 16 reaches the absolute position AP1 (steps S44 and S47). The controller 52 stores the additional absolute position AP2 as the reference position RP if the first additional information F2 indicates that the second member 16 reaches the additional absolute position AP2 (steps S47 and S48). The controller 52 resets the second information F3 if the first additional information F2 indicates that the second member 16 reaches the additional absolute position AP2 (steps S47 and S49). The process enters step S52.

The controller 52 calculates the current position CP based on the reference position RP and the second information F3 (step S50). Specifically, the controller 52 adds the second information F3 to the reference position RP to obtain the current position CP. The controller 52 compares the current position CP with each of the stop positions SP1 to SP9. The controller 52 controls the actuator 44 to stop moving the second member 16 if the current position CP is coincident with one of the stop positions SP1 to SP9 (steps S51 and S52). Thus, the second member 16 is stopped in one of the absolute position AP1, the additional absolute position AP2, and the stop positions SP1 to SP9. The controller 52 controls the first detector 60, the first additional detector 62, and the second detector 64 to stop detecting the first information F1, the first additional information F2, and the second information F3 (step S53). The process returns to the step S31.

Modifications

Figure 25:
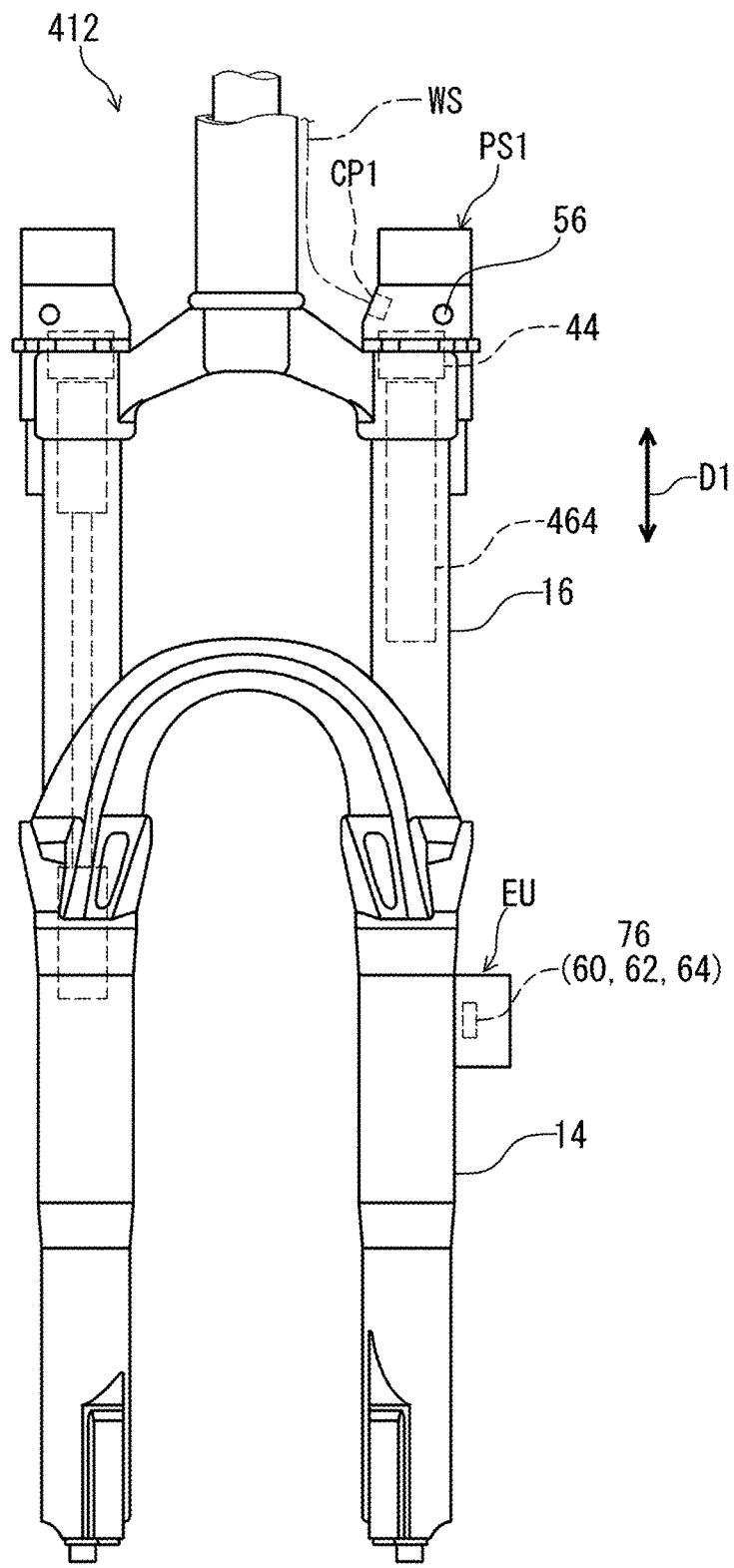
FIG. 25 is a perspective view of a rider-posture changing device in accordance with a modification.

In the first to third embodiments, the rider-posture changing device 12, 212, or 312 includes a height adjustable seatpost assembly. However, the rider-posture changing device 12, 212, or 312 can include other devices such as a suspension if needed and/or desired. The structures of the rider-posture changing devices 12, 212, and 312 can apply to other devices such as a suspension if needed and/or desired. As seen in FIG. 25, for example, a rider-posture changing device 412 comprises the first member 14, the second member 16, the first detector 60, the first additional detector 62, the second detector 64, the controller 52, the wireless communicator WC1, the connection port CP1, the informing unit 56, the electric power source PS1, the electric unit EU, the actuator 44, and the optical sensor 76.

The rider-posture changing device 412 comprises a height adjustment structure 464. The height adjustment structure 464 is configured to change a relative position between the first member 14 and the second member 16 in the longitudinal direction D1. The actuator 44 is configured to actuate the height adjustment structure 464 to change the relative position between the first member 14 and the second member 16 in the longitudinal direction D1.

In the first to third embodiments, the second detectors 64, 264, and 364 include a non-contact detector. However, at least one of the second detectors 64, 264, and 364 can include a contact detector if needed and/or desired.

The structures of the rider-posture changing devices 12, 212, and 312 of the first to third embodiments can be combined with each other if needed and/or desired. For example, the screw rod 332 can apply to the rider-posture changing devices 12 and 212 of the first and second embodiments instead of the hydraulic structure 18. The first detector 360, the first additional detector 362, and the detection object 373 can apply to the rider-posture changing devices 12 and 212 of the first and second embodiments instead of the first detector 60 or 260, the first additional detector 62 or 262, the first detection object 70 or 270, and the first additional detection object 72 or 272.

The non-contact detector can be detectors other than the optical sensor and the magnetic sensor. The contact detector can be detectors other than the resistive sensor, such as mechanical switches (e.g., a tact switch).

The arrangement of the first detector 60, 260 or 360, the first additional detector 62, 262 or 362, the second detector 64, 264 or 364, the controller 52, the wireless communicator WC1, the connection port CP1, the informing unit 56, the electric power source PS1, the electric unit EU, and the actuator 44 is not limited to the above embodiments and the modifications. For example, at least one of the controller 52, the wireless communicator WC1, the informing unit 56, the electric power source PS1, and the electric unit EU can be provided in other positions such as at least one of the first additional end 14B of the first member 14 and the second end 16A of the second member 16. At least one of the actuator 44 and the connection port CP1 can be provided in other positions such as the first end 14A of the first member 14 and the second end 16A of the second member 16. The first detector 60, 260 or 360, the first additional detector 62, 262 or 362, and the second detector 64, 264 or 364 can be provided in positions other than the positions disclosed in the above embodiments and the modifications. Furthermore, at least one of the first detector 60, 260 or 360, the first additional detector 62, 262 or 362, the second detector 364, the controller 52, the wireless communicator WC1, the informing unit 56, the electric power source PS1, and the electric unit EU can be provided radially inward of an outer peripheral surface of the first member 14.

In the present application, the team "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A rider-posture changing device for a human-powered vehicle, the rider-posture changing device comprising:
    a first member extending in a longitudinal direction;
    a second member configured to be movable relative to the first member in the longitudinal direction;
    a first detector that detects first information indicating whether the second member reaches an absolute position or not;
    a second detector that detects second information indicating a movement distance of the second member from a reference position in the longitudinal direction; and
    a controller that obtains a current position of the second member relative to the first member based on the second information and the reference position, the controller stores the absolute position as the reference position in accordance with the first information, wherein
    the first information is different from the second information.

2. The rider-posture changing device according to claim 1, wherein
    the controller resets the second information if the first information indicates that the second member is in a position within a predetermined range including the absolute position.

3. The rider-posture changing device according to claim 1, further comprising
    a first additional detector configured to detect first additional information indicating whether the second member reaches an additional absolute position or not, wherein
    the additional absolute position is spaced apart from the absolute position in the longitudinal direction.

4. The rider-posture changing device according to claim 3, wherein
    the controller is configured to store the additional absolute position as the reference position in accordance with the first additional information.

5. The rider-posture changing device according to claim 1, further comprising
    a first detection object provided to at least one of the first member and the second member, wherein
    the first detector is configured to detect the first detection object to obtain the first information.

6. The rider-posture changing device according to claim 5, wherein
    the first detector includes a non-contact detector configured to detect the first detection object to obtain the first information without contacting the first detection object.

7. The rider-posture changing device according to claim 5, wherein
    the first detector includes a contact detector configured to detect the first detection object to obtain the first information by contacting the first detection object.

8. The rider-posture changing device according to claim 1, further comprising
    a second detection object provided to at least one of the first member and the second member, wherein
    the second detector is configured to detect the second detection object to obtain the second information.

9. The rider-posture changing device according to claim 8, wherein
    the second detector includes a non-contact detector configured to detect the second detection object to obtain the second information without contacting the second detection object.

10. The rider-posture changing device according to claim 1, wherein
    the first detector and the second detector are integrally provided with each other as a single unit.

11. The rider-posture changing device according to claim 1, further comprising
    a wireless communicator, wherein
    the controller is configured to be connected to the wireless communicator to wirelessly communicate with an additional wireless communicator.

12. The rider-posture changing device according to claim 1, further comprising an informing device configured to inform a user of information relating to the rider-posture changing device.

13. The rider-posture changing device according to claim 1, further comprising
an electric power source configured to supply electric power to the rider-posture changing device.

14. The rider-posture changing device according to claim 1, further comprising
an electrical unit mounted to the first member, wherein
the electrical unit includes at least one of the first detector, the second detector, the controller, a wireless communicator, and an informing device, and
the at least one of the first detector, the second detector, the controller, the wireless communicator, and the informing device provides a single unit configured to be detachably attached to the first member as the single unit.

15. The rider-posture changing device according to claim 14, wherein
the electrical unit is mounted to an upper end of the first member.

16. The rider-posture changing device according to claim 1, further comprising
an actuator, wherein
the first member includes a first tube,
the second member includes a second tube, and
the actuator is configured to make one of the first tube and the second tube movable relative to another of the first tube and the second tube.

17. A control system for a human-powered vehicle, comprising:
the rider-posture changing device according to claim 1; and
an operating device configured to operate the rider-posture changing device.

18. The control system for a rider posture changing device according to claim 17, wherein
the rider-posture changing device includes a height adjustable seatpost assembly.

19. The rider-posture changing device according to claim 1, further comprising
a first detection object provided to at least one of the first member and the second member, and
a second detection object provided to at least one of the first member and the second member, wherein
the first detector is separate from the second detector, and
each of the first detector and the second detector detect the first detection object and the second detection object.

20. A rider-posture changing device for a human-powered vehicle, the rider-posture changing device comprising:
a first member extending in a longitudinal direction;
a second member configured to be movable relative to the first member in the longitudinal direction;
a first detector that detects first information indicating whether the second member reaches an absolute position or not;
a second detector that detects second information indicating a movement distance of the second member from a reference position in the longitudinal direction; and
a controller that obtains a current position of the second member relative to the first member based on the second information and the reference position, the controller resets the second information in accordance with the first information, wherein
the first information is different from the second information.

21. The rider-posture changing device according to claim 20, further comprising
a first additional detector configured to detect first additional information indicating whether the second member reaches an additional absolute position or not, wherein
the additional absolute position is spaced apart from the absolute position in the longitudinal direction.

22. The rider-posture changing device according to claim 21, wherein
the controller is configured to reset the second information in accordance with the first additional information.

23. The rider-posture changing device according to claim 20, wherein
the controller resets the second information if the first information indicates that the second member is in a position within a predetermined range including the absolute position.

24. The rider-posture changing device according to claim 20, further comprising
a first detection object provided to at least one of the first member and the second member, and
a second detection object provided to at least one of the first member and the second member, wherein
the first detector is separate from the second detector, and
each of the first detector and the second detector detect the first detection object and the second detection object.

* * * * *